United States Patent
Michel et al.

(10) Patent No.: US 9,183,074 B2
(45) Date of Patent: Nov. 10, 2015

(54) INTEGRATION PROCESS MANAGEMENT CONSOLE WITH ERROR RESOLUTION INTERFACE

(71) Applicant: Dell Products, LP, Round Rock, TX (US)

(72) Inventors: Peter I. Michel, Phoenixville, PA (US); Mitchell J. Stewart, Malvern, PA (US); James T. Ahlborn, Downingtown, PA (US); Richard C. Nucci, Wynnewood, PA (US)

(73) Assignee: Dell Products, LP, Round Rock, TX (US)

(*) Notice: Subject to any disclaimer, the term of this patent is extended or adjusted under 35 U.S.C. 154(b) by 208 days.

(21) Appl. No.: 13/923,958

(22) Filed: Jun. 21, 2013

(65) Prior Publication Data

US 2014/0380105 A1    Dec. 25, 2014

(51) Int. Cl.
*G06F 11/00* (2006.01)
*G06F 11/07* (2006.01)

(52) U.S. Cl.
CPC ........ *G06F 11/0769* (2013.01); *G06F 11/0793* (2013.01)

(58) Field of Classification Search
CPC ................. G06F 11/0769; G06F 11/0793
See application file for complete search history.

(56) References Cited

U.S. PATENT DOCUMENTS

| | | | |
|---|---|---|---|
| 5,410,675 A | 4/1995 | Shreve et al. | |
| 5,794,246 A | 8/1998 | Sankaran et al. | |
| 5,917,730 A | 6/1999 | Rittie et al. | |
| 5,953,533 A | 9/1999 | Fink et al. | |
| 6,014,670 A | 1/2000 | Zamanian et al. | |
| 6,032,158 A | 2/2000 | Mukhopadhyay et al. | |
| 6,038,590 A | 3/2000 | Gish | |
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |
| 6,626,957 B1 | 9/2003 | Lippert et al. | |
| 6,640,226 B1 | 10/2003 | Shringeri et al. | |
| 6,789,096 B2 | 9/2004 | Sankaran et al. | |

(Continued)

OTHER PUBLICATIONS

Oracle Internal Controls Manager 11i—Data Sheet, Oracle, Apr. 2003.

(Continued)

*Primary Examiner* — Joshua P Lottich
(74) *Attorney, Agent, or Firm* — Larson Newman, LLP

(57) ABSTRACT

An information handling system for resolving integrated business process system errors includes a processor executing instructions to scrub an error message for an integrated business process system error from an integrated business process event to remove user specific information. The information handling system further includes a processor interface device for transmitting a search request to a multi-user community scrubbed system error database at a storage device for scrubbed resolution articles using the scrubbed error message. The information handling system includes the processor interface device sending the scrubbed resolution articles in a rank-order to display, via an error resolution graphical user interface.

20 Claims, 9 Drawing Sheets

(56) References Cited

U.S. PATENT DOCUMENTS

| | | | |
|---|---|---|---|
| 6,820,077 | B2 | 11/2004 | Godfredsen et al. |
| 6,820,135 | B1 | 11/2004 | Dingman et al. |
| 6,823,373 | B1 | 11/2004 | Pancha et al. |
| 6,850,947 | B1 | 2/2005 | Chung et al. |
| 6,854,107 | B2 | 2/2005 | Green et al. |
| 6,895,409 | B2 | 5/2005 | Uluakar et al. |
| 6,895,471 | B1 | 5/2005 | Tse et al. |
| 6,922,831 | B1 | 7/2005 | Kroening et al. |
| 6,988,165 | B2 | 1/2006 | White et al. |
| 6,993,743 | B2 | 1/2006 | Crupi et al. |
| 6,996,584 | B2 | 2/2006 | White et al. |
| 7,047,219 | B1 | 5/2006 | Martin et al. |
| 7,117,215 | B1 | 10/2006 | Kanchwalla et al. |
| 7,162,643 | B1 | 1/2007 | Sankaran et al. |
| 7,181,457 | B2 | 2/2007 | Reinauer et al. |
| 7,383,215 | B1 | 6/2008 | Navarro et al. |
| 7,765,136 | B2 | 7/2010 | Northington et al. |
| 8,060,396 | B1 | 11/2011 | Bessier et al. |
| 8,315,939 | B2 | 11/2012 | Blank |
| 2001/0052112 | A1 | 12/2001 | Mohan et al. |
| 2002/0016771 | A1 | 2/2002 | Carothers et al. |
| 2002/0073396 | A1 | 6/2002 | Crupi et al. |
| 2002/0095650 | A1 | 7/2002 | Green et al. |
| 2002/0104067 | A1 | 8/2002 | Green et al. |
| 2003/0221184 | A1 | 11/2003 | Gunjal et al. |
| 2004/0133876 | A1 | 7/2004 | Sproule |
| 2004/0236683 | A1 | 11/2004 | Guermonprez et al. |
| 2005/0005262 | A1 | 1/2005 | Mohan et al. |
| 2005/0198618 | A1 | 9/2005 | Lalonde et al. |
| 2005/0273758 | A1 | 12/2005 | Long |
| 2006/0161495 | A1 | 7/2006 | Wigzell |
| 2006/0184933 | A1 | 8/2006 | Chessell et al. |
| 2007/0150385 | A1 | 6/2007 | Ode |
| 2008/0243884 | A1 | 10/2008 | Mehta |
| 2009/0006267 | A1 | 1/2009 | Fergusson et al. |
| 2009/0171758 | A1 | 7/2009 | Alfandary et al. |
| 2009/0228428 | A1 | 9/2009 | Dan et al. |
| 2010/0042641 | A1 | 2/2010 | Kamalakantha et al. |
| 2010/0070317 | A1 | 3/2010 | Pachter et al. |
| 2010/0070556 | A1 | 3/2010 | Heusermann et al. |
| 2010/0138257 | A1 | 6/2010 | Wocher et al. |
| 2010/0169148 | A1 | 7/2010 | Oberhofer et al. |
| 2010/0185510 | A1 | 7/2010 | Maier et al. |
| 2010/0332510 | A1 | 12/2010 | Gitai et al. |
| 2010/0332535 | A1 | 12/2010 | Weizman et al. |
| 2011/0004627 | A1 | 1/2011 | Reca et al. |
| 2011/0029575 | A1 | 2/2011 | Sagi et al. |
| 2011/0078607 | A1 | 3/2011 | Ryan et al. |
| 2011/0218843 | A1 | 9/2011 | Goel et al. |
| 2012/0096279 | A1 | 4/2012 | Roberts et al. |
| 2013/0238641 | A1 | 9/2013 | Mandelstein et al. |
| 2013/0275369 | A1 | 10/2013 | Hajare et al. |

OTHER PUBLICATIONS

Few, Stephen, Intelligent Dashboard Design Perceptual Edge, Sep. 2005.

Resnick, Marc L., Building the Executive Dashboard, Proceedings of the Human Factors and Ergometrics Society, 47th Annual Meeting, 2003.

Evans, Owen B., Billing Score Card, University of Mississippi Medical Center, 2006.

The Financial Edge—Dashboard Guide, Blackbaud, Inc., 2011.

Bordeleau, David, Exploring Alternative Predictive Modeling Techniques to Strengthen the Customer Relationship, SAS SUGI31, Data Mining and Predictive Modeling, 2006.

Kareo.com Web pages—Dashboards, Kareo, Jan. 2010, Retrieved from Archive.org, Feb. 19, 2013.

Gonzalez, Tom, Designing Executive Dashboards—Part 1, BrightPoint Consulting, Inc., 2005.

Gonzalez, Tom, Designing Executive Dashboards—Part 2, BrightPoint Consulting, Inc., 2005.

Boomi AtomSphere, Boomi, Inc., 211 pages http://web.archive.org/web/20100429065017/http:/help.boomi.com/display/BOD/Boomi+AtomSphere+Helpboomi.com/display/BOD/Boomi+AtomSphere+Help.

Boomi AtomSphere, Boomi, Inc., 47 pages http://help.boomi.com/atomsphere/#GUID-B17ADCD8-8B85-4D68-A360-9552EAA22225.html.

Boomi AtomSphere web, Boomi, Inc., http://help.boomi.com/atomsphere/#GUID-B17ADCD8-8B85-4D68-A360-9552EAA22225.html.

Boomi AtomSphere Maps, Boomi, Inc., http://help.boomi.com/display/BOD/3.4+-+Building+Data+Maps.

Boomi AtomSphere API, Boomi, Inc., http://help.boomi.com/atomsphere/#GUID-C6847C47-5EFF-4933-ADA1-A47D032471C6.html.

Boomi AtomSphere Getting Started, Boomi, Inc., http://help.boomi.com/atomsphere/GUID-43F13F31-E82A-4AF8-BE49-9213D4715411.html#GUID-B522EE93-E8A2-43CC-9D3E-EF37371AEF32.html.

Boomi AtomSphere Core Terms, Boomi, Inc., http://help.boomi.com/atomsphere/GUID-CD1886F1-DCAC-41C1-A255-4287B78A2DE7.html.

Dell Boom AtomSphere Fall Release Harnesses Power of World's Largest Integration Cloud to Simplify Integration Complexity; http://www.boomi.com/news_and_events/press_releases/25102011.

Boomi AtomSphere Help, Boomi, Inc., Apr. 29, 2010 web.archive.org/web/20100429065017/http://help.boomi/display/BOD/Boomi+AtomSphere+Help.

Boomi AtomSphere Build, Boomi, Inc., Apr. 29, 2010 web.archive.org/web/20100429041219/http://help.boomi/display/BOD/3+-+Build.

Boomi AtomSphere Building Connectors, Boomi, Inc., May 10, 2010 web.archive.org/web/20100510115902/http://help.boomi/display/BOD/3.2+-+Building+Connectors.

Boomi AtomSphere Building Processes, Boomi, Inc., Dec. 12, 2009 web.archive.org/web/20091212010359/http://help.boomi/display/BOD/3.1+-+Building+Processes.

Boomi AtomSphere Manage, Boomi, Inc., Apr. 30, 2011 web.archive.org/web/20110430060121/http://help.boomi.com/display/BOD/5+-+Manage.

Boomi AtomSphere Monitoring Atoms, Boomi, Inc.,Nov. 9, 2010 web.archive.org/web/20101109011443/http://help.boomi/display/BOD/5.1+-+Monitoring+Atoms.

Boomi AtomSphere Executing a Process, Boomi, Inc., Nov. 9, 2010 web.archive.org/web/20101109025104/http://help.boomi/display/BOD/5.2+-+Executing+a+Process.

Boomi AtomSphere Viewing Process Executions, Boomi, Inc., Nov. 9, 2010 web.archive.org/web/20101109011449/http://help.boomi/display/BOD/5.3+-+Viewing+Process+Executions.

Boomi AtomSphere Atom Management, Boomi, Inc., May 19, 2011 web.archive.org/web/20110519171500/http://help.boomi/display/BOD/5.4+-+Atom+Management.

Boomi AtomSphere The Boomi Atom, Boomi, Inc., Jun. 13, 2010 web.archive.org/web/20100613115315/http://help.boomi/display/BOD/8+-+The+Boomi+Atom.

"The Quest for a Cloud Integration Strategy," Boomi Whitepaper, 2011, http://marketing.boomi.com/QuestForCloudIntegration.html.

INTEGRATION PROCESS MANAGEMENT CONSOLE WITH ERROR RESOLUTION INTERFACE

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is also contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

Related subject matter is also contained in co-pending U.S. patent application Ser. No. 13/471,847 entitled "Monitoring Business Processes with Hierarchical Dashboard," filed on Mar. 19, 2012, the disclosure of which is hereby incorporated by reference.

Related subject matter is also contained in co-pending U.S. patent application Ser. No. 13/423,749 entitled "System for Predicting Integrated System Process Performance," filed on May 15, 2012, the disclosure of which is hereby incorporated by reference.

FIELD OF THE DISCLOSURE

This disclosure generally relates to information handling systems, and more particularly relates to an integration process management system with an error resolution system and graphical user interface for resolving integrated business processes system errors.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
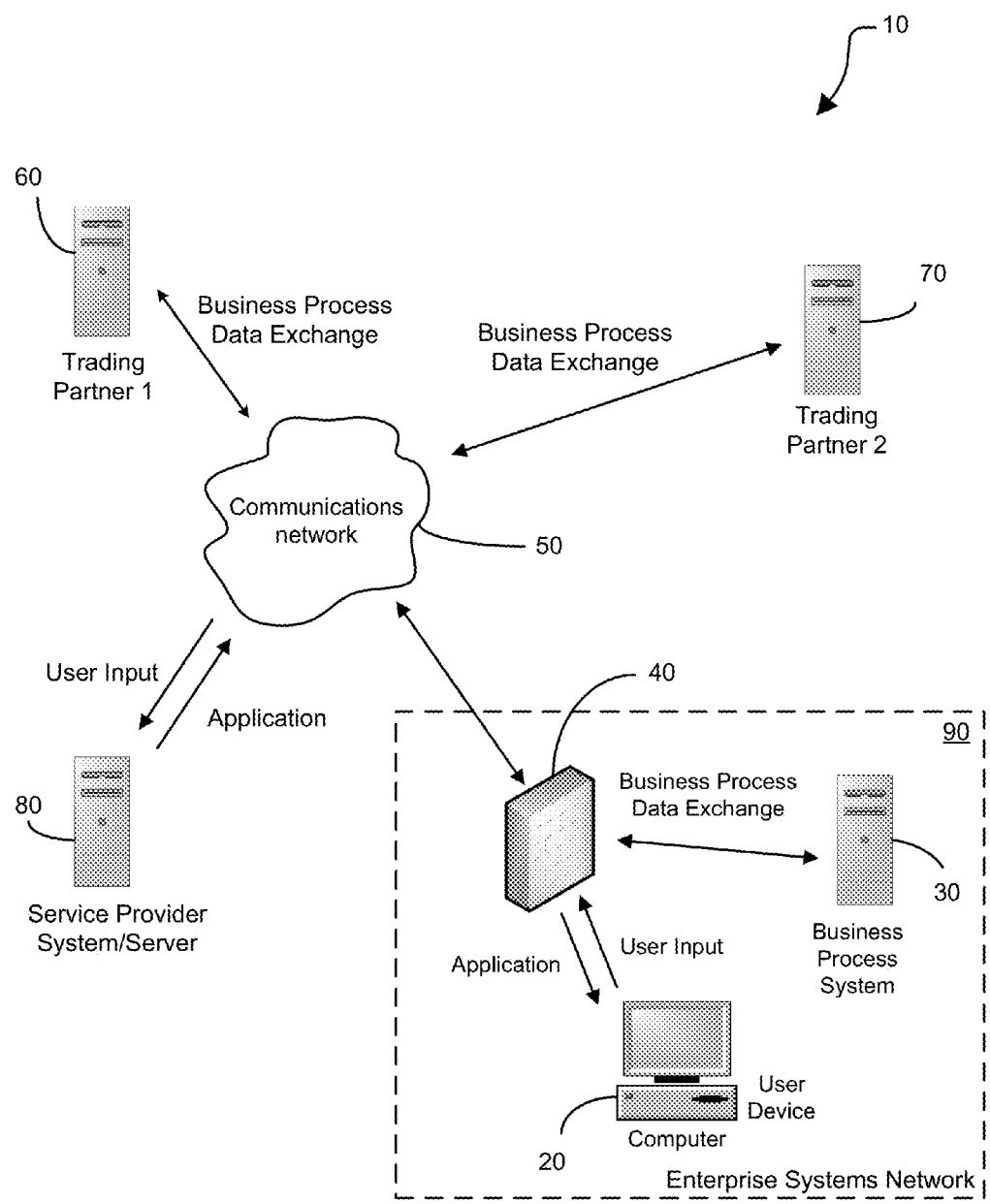
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. Alternatively, the supplier may engage computer programmers to create a customized software application to meet these requirements, which is often exceptionally time-consuming and expensive.

U.S. patent application Ser. No. 12/110,607 entitled "System and Method For Automated On-Demand Creation of a Customized Software Application," shows a system for automated development of customized executable system integration software applications. Such an integrated business process development system can assist defining the business process to be integrated by a user. For example, an enterprise can define an integration system via a modeling process to enable bi-directional exchange of data between internal applications, between internal applications and external trading partners, or between internal applications and applications running external to the enterprise. Applications running external to the enterprise are commonly referred to as Software as a Service (SaaS). Each integrated business process represents a complete end-to-end interface and may include one or more customized executable system integration software applications. For example, a process could be customized to accept a purchase order (PO) from a retailer, transform the PO into a format recognizable by a certain internal order management software application of the enterprise, and then insert the contents of that PO directly into the enterprise's order management system. The customized executable system integration software application that results, referred to as an integrated business process, provides the desired interoperability as defined by the party using the integrated business process development system.

In the business process integration context, communication should occur between different software applications or systems within a single computing network, such as between an enterprise's information warehouse management system and the same enterprise's purchase order processing system. Communication should also occur between different software applications or systems within different computing networks, such as between a buyer's purchase order processing system and a seller's invoicing system. Upon integration of the business processes, an aspect of the present disclosure enables monitoring detailed status and error information relating to the integrated business processes during their execution. For example, the detailed monitored information may be used for diagnostic purposes and resolving problems. The detailed monitored information may allow the user access to details enabling a more thorough analysis and diagnosis of an integrated business process, prepare a resolution for malfunctions or improve performance. For example, a user may isolate and resolve system errors more effectively in an integrated business process with detailed error information for a specific integrated business process event.

During the end to end execution of an integrated business process, referred to as an integrated business process event, one or more errors may occur that require resolution. These errors are referred to as integrated business process system errors and it is integrated business process system error resolution methodology that is discussed herein. The disclosed systems and methods for resolving integrated business process system errors are multi-user in that the errors or similar errors may be experienced by multiple users. The disclosed systems and methods provide resolution capabilities to multiple users via an error resolution graphical user interface, enable users to share error resolution information with other users and leverage other user's error resolution information and expertise. To enable the sharing of error resolution information across a multiple user community, the disclosed systems and methods include scrubbing methods to remove user specific, user sensitive information from the error resolution information prior to sharing. The error resolution information includes error messages and resolution articles. A resolution article may contain a full or partial solution to an integrated business process system error and may indicate how to partly or fully resolve the error. An exemplary error message scrubbing method identifies frequent terms and infrequent terms in the error message and keeps the frequent terms in the error message and replaces the infrequent terms with a predefined value to create a scrubbed version of the error message. The infrequent terms in an error message are more apt to be user specific, user sensitive information and the frequent terms are more apt to be critical to the error. A similar exemplary resolution article scrubbing method is used to remove user specific, user sensitive information from a resolution article to create a scrubbed version of the resolution article. The scrubbed error message and scrubbed resolution article are the scrubbed versions of the error resolution information that may be shared. These scrubbing methods are discussed fully below with respect to FIGS. 4 and 5. In addition to removing user specific information, the scrubbing methods may also allow similar integrated business process system errors to be grouped together and may allow for quicker integrated business process system error resolution.

Another aspect of the present disclosure is to provide users with the capabilities to share their resolutions to integrated business process system errors they encountered and discovered as well as to provide feedback on the effectiveness of other resolutions they found as a result of searching known integrated business process system errors and resolutions. For example, one user may provide and share their resolution to an integrated business process system error and another user may be able to utilize that resolution to solve a similar system error that they encountered. As another example, a user may try multiple resolutions that were found in a search of the known integrated business process system errors and provide feedback on the effectiveness of each of the resolutions and the one that best resolved the specific issue they were encountering. Leveraging the user's experience and expertise in determining effectiveness of resolutions and debugging and resolving integrated business process system errors in this way may be valuable to the users of the integrated business processes.

FIGS. 1-10 illustrate a system and method for resolving integrated business process system errors from an integration management system with an error resolution graphical user interface based on detailed status and error information monitored and gathered during an integrated business process event. The systems and methods comprises monitoring detailed status and error information during the execution of integrated business processes events running one or more customized executable system integration software applications. The integrated business process for each customized executable system integration software application may be automatically developed on-demand and real-time for an enterprise by a service provider system or server 80 within the network 10 depicted in FIG. 1. The customized executable system integration software applications run one or more integrated business processes. Each may integrate one or more internal enterprise applications, one or more types of external applications (for example, those of a trading partner), or some combination of both.

An integrated business process event may exchange any amount of data or any number of documents. The operation of the customized executable system integration software application during an integrated business process event may be monitored in its entirety or in a subset of parts. The monitoring may be customized for various purposes such as to conduct testing or to assess health or status of the integrated business process elements. The monitored and gathered detailed information of a completed end to end execution of an integrated business process event is referred to as an integrated business process execution record. A collection of integrated business process execution records is referred to as an integrated business process execution history. The monitored and gathered integrated business process execution records may contain integrated business process system error information for integrated business process system errors that occurred during the execution of the integrated business process event. The monitored integrated business process execution records may be reported from the location operating the runtime engine that runs the customized executable system integration software application. The monitored integrated business process execution records may also be submitted to a database referred to as a user's integrated business process execution history database. This location may be a hosted runtime engine, a local runtime engine, or some networked combination of either or both. The monitored integrated business process execution records may be reported back to a service provider system or server 80 or may be reported within an enterprise systems network 90 and may also be submitted to a user's integrated business process execution history database. The monitored integrated business process execution records may also be submitted to a multi-user community integrated business process execution history database.

Another aspect of the present disclosure is to provide users access and search capabilities to known integrated business process system errors and their resolutions. As another example, a user may be able to utilize the detailed integrated business process system error information in the integrated business process execution history to search known integrated business process system errors for a resolution to the integrated business process system error or similar integrated business process system errors that were previously encountered and resolved for another user. In particular, when multiple integrations are simultaneously operating, this monitoring and gathering of integrated business process execution records and adding them to integrated business process execution histories along with the capability to search the known integrated business process system errors and their resolutions may be valuable to the users of the integrated business processes.

Thus, embodiments of the present disclosure may monitor and gather detailed information from integrated business processes, maintain resolutions to the known integrated business process system errors, remove user specific information from the integrated business process system error and resolution information, provide the capability to search for resolutions using an error message for the known integrated business process system errors, provide the capability for users to share resolutions to integrated business process system errors and to provide feedback on the effectiveness of other integrated business process system error resolutions, and provide useful and versatile access to the gathered monitored integrated business processes execution histories and the maintained known integrated business process system errors and their resolutions. It is understood any of the features, any subset, or all features could be employed. The users of the systems and methods of the present disclosure include a service provider, an integration service provider, an enterprise, or even a trading partner. A community of experts are also users of the systems and methods of the present disclosure and include the support staff, the service staff and the Research and Development staff for the Integrated Business Process Development System. In one of their more visible roles, the community of experts provides experts' resolution articles for unresolved system errors that have high occurrence rates or trend highly. They also review and approve all user resolution contributions.

FIG. 1 shows a distributed business network system 10 including conventional information handling systems of a type typically found in client or server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The user device 20 is positioned within the enterprise systems network 90 behind an enterprise network's firewall 40. For illustrative purposes, the enterprise systems network 90 includes a business process system 30, which may include conventional computer hardware and commercially available Enterprise Resource Planning (ERP) and other business process software such as QuickBooks, SAP's MySAP ERP, Oracle's OneWorld, JD Edwards' ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes.

Finally, the system 10 includes an integration service provider system or server 80. In one embodiment, the integration service provider server 80 may generate a customized executable system integration software application to run an integrated business process at an enterprise location or another hosted location. In another embodiment, the service provider server 80 may monitor one or more business processes running at various locations. Integrated business process execution records may be reported to the service provider server 80 from business processes running at hosted locations or enterprise locations in various embodiments. These integrated business process execution records may be submitted to each user's integrated business process execution history database associated with each user's integrated business process execution record. These integrated business process execution records may also be submitted to a multi-user community integrated business process execution history database. These integrated business process execution records may be stored at the server 80. The users' integrated business process execution history databases and the multi-user community integrated business process execution history database may also be located at the server 80.

In an additional embodiment, the service provider server 80 may administer one or more business processes. The service provider server 80 may run an integrated business process system error resolution system to find a resolution to an integrated business process system error that occurred during the execution of the integrated business process event from a specific user's integrated business process execution history database. In one embodiment, the service provider server 80 may run an integrated business process system error resolution system to find a resolution to an integrated business process system error that occurred during the execution of the integrated business process event from the multi-user integrated business process execution history database. In other embodiments, one or more functions described above may occur at a system or server in a different location, such as the enterprise systems network 90 or at a trading partner location.

The customized executable system integration software application may be packaged within a container program, also referred to herein as a dynamic runtime engine. An example runtime engine that may package the customized executable system integration software application is a JAVA runtime engine. The dynamic runtime engine may be an executable software application capable of running on a computer within the enterprise's network, which may include, for example, networks owned and/or operated by third party data center providers, such as OpSource, Amazon, etc. Alternatively, the runtime engine may be distributed and operated on one or more hosted information handling systems accessible by a user. As changes are made to the model underlying the customized executable system integration software application, the executable software application can automatically check for and apply these changes as needed without requiring human intervention.

Each business process utilizing a customized executable system integration software application is associated with its respective users and/or trading partners. This is the account information for that particular customized executable system integration software application deployment. A service provider or user may choose to group integrated business processes and their monitored integrated business process execution records to assess the function of customized executable system integration software applications across a broader perspective, for example multiple deployments at a given location or multiple deployments within a given user account. A user account may also have associated sub-accounts or other related accounts. Analysis of the monitored integrated business process execution records in the user's integrated business process execution history database coupled with searching the multi-user community scrubbed system error database for scrubbed resolution articles using the error message for an integrated business process system error may permit more efficient resolution of system errors in deployed integrated business processes at a given enterprise location or in a hosted environment.

Figure 2:
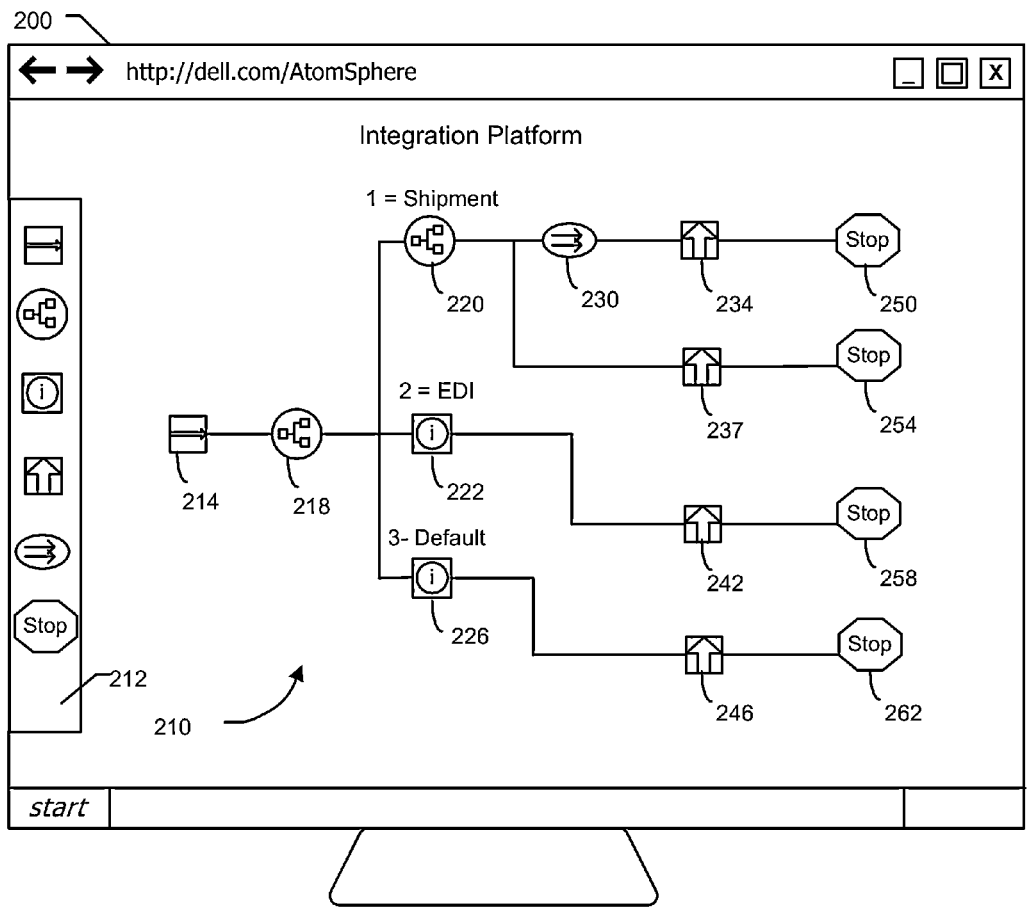
FIG. 2 illustrates a visual model of an example business process integration according to an embodiment of the present disclosure.

The user may create a model business process or processes to be executed by the customized executable system integration software application via a graphical editor. The exemplary flow diagram of FIG. 2 shows a graphical user interface 200 of an integration platform. The exemplary graphical user interface 200 displays an exemplary business process integration model 210 in the form of a flow diagram modeling a shipment order business process. The business process integration model 210 includes an inbound connector element 214, routing process elements 218 and 220, document property elements 222 and 226, data transformation process element 230, outbound connector elements 234, 237, 242, and 246, and process end elements 250, 254, 258 and 262. Various ones of these elements are selected from a menu 212 of elements and arranged by the user relative to one another as appropriate to model a corresponding business process. Since the elements may require data input from a user, the resulting codesets that make up the customized executable system integration software application contain information about each element. For example, the inbound connector element 214 may be configured for a specific enterprise and process with data input via dialog boxes or selecting menu items, etc. as appropriate. For example, data entry element 214 may be configured such that the input data will be inbound from a SAP system. The element, in combination with data related to that portion of the business process is associated with a specific Connector code set stored in the memory of the system 80. Each Connector is comprised of a modular codeset that is customized for communicating with the specific software application or system. The customized codeset therefore provides connectivity for specific software applications, databases, and/or systems. The outbound connector elements may be similarly configured. For example, the last step of the integrated business process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. The input and output data formats for the conversion are associated with the modular codeset selected and customized for the outbound connector element. Additionally, the routing element may require custom data associated with it for proper application of the routing logic; the document properties element may require input for file naming, file storage location, etc. to be applied. There may be other elements that result in codesets for the customized executable system integration software application as customized by the user and generated by the service provider.

Each branch of the flow diagram represents an end-to-end business process to be integrated. In the example of FIG. 2, the first (top-most) branch may model a process involving receipt of data from a SAP system in a corresponding format, routing the data according to prescribed logic (for example, 1=shipment), further routing according to further logic, transforming the data from the SAP system format to the destination system format by data transformation process element 230 to create an appropriately formatted XML document, and then transmitting the transformed data to the destination system in accordance with the properties and attributes of the outbound application connector 234. Examples of other common activities include synchronizing user data between applications, synchronizing product information between applications, notification of receipt of goods ordered by a retailer, receipt of a work related injury claim, and many others. The model business process or processes are automatically assembled into customized executable codesets that form the customized executable system integration software applications. As explained elsewhere, these customized executable system integration software applications may be run at an enterprise network location or hosted in a cloud computing environment such as one hosted by the service provider.

For example, an enterprise account using a customized executable system integration software application will execute a business process at one or more locations. The business process execution locations for an account are sometimes referred to herein as atoms. However, a given atom may have more than one business process run at the same location. For example, one may be a test business process, while another at the same location may be a "live" operating business process. The monitored integrated business process execution record may be reported from an account location and a specific atom running an integrated business process.

The execution of the integrated business processes may be monitored by the customized executable system integration software applications themselves. Additionally, more specific information relating to the documents or data processed by the integrated business process may be included in the integrated business process execution record in the form of detailed error messages and context information for errors encountered during processing. In an example embodiment, these monitored and gathered detailed integrated business process execution records may be created during the execution of the integrated business process events and each integrated business process execution record may be submitted to each user's integrated business process execution history database. In addition, each integrated business process execution record may be submitted to the multi-user community integrated business process execution history database. In an example embodiment, these monitored integrated business process execution records may be ultimately collected by the service provider system/server 80 or some other system or server within the enterprise systems network 90. Each user's monitored integrated business process execution records may be recorded and collected at the enterprise or hosted location.

While the customized executable system integration software application is running, the data may be kept in RAM or stored at a local database (for example, a disk). Reporting of the user's integrated business process execution records of the customized executable system integration software application may alternatively be reported to a database maintained at the user's enterprise hardware in the enterprise systems network 90. In yet another alternative embodiment, the user's integrated business process execution records for the customized executable system integration software application may be monitored by and reported to systems/servers and database locations of individual trading partners 60 and 70. In yet another embodiment, the users' integrated business process execution history databases and the multi-user community integrated business process execution history database may be located at the service provider system/server 80 or some other system or server within the enterprise systems network 90.

The category of data that may be monitored and gathered in an integrated business process execution record is the monitored detail status and error information for customized executable codesets that form the customized executable system integration software applications. In other words, the monitored and gathered integrated business process execution record is the data that may be kept for each execution of an integrated business process event and may be submitted to a user's integrated business process execution history database that may be stored for each executable system integration software application deployed for a user. The integrated business process execution records may also be submitted to a multi-user community integrated business process execution history database. The integrated business process execution record may contain integrated business process system error information for system errors that occurred during the execution of the integrated business process event. The integrated business process system error information comprises error messages and context information associated with each system error and error message. The system error context information may be linked to specific elements of the end-to-end integrated business process and may include the error type, such as an inbound or outbound connection error, a data error, a document transformation error, an application error, and a network failure. System error context information may also include an integration class, an execution engine exception, a shape type, a connector type, a stack trace, information ordering multiple errors from the most relevant error to the least relevant error, and a transformation map.

In one embodiment, the search of the multi-user community integrated business process system error database is done using the scrubbed error message and the system error context information. Searching based on both the scrubbed error message and the system error context information may result in finding a resolution article that may isolate the location of the error within the integrated business process. A key element that the search takes advantage of is the graphical shapes and their types that were used to create the model process/processes to be executed by the customized executable system integration software application via the graphical editor discussed earlier. When a system error occurs during execution of an integrated business process event, the error message and the context information associated with the error and error message are added to the integrated process execution record. The context information includes the shape type which references the element in the model business process, shown in the exemplary flow diagram of FIG. 2.

To further assist in the teachings of the present disclosure, the various example shapes used to create a model business process or processes via graphical editor are described. The shapes described below are exemplary and additional shapes may be incorporated and used with the embodiments of the current disclosure. Model business processes contain a left-to-right series of Shapes connected together like a flow chart to illustrate the steps required to transform, route, and otherwise manipulate the data from source to destination. Model Business processes use Connectors to get and send date. Processes may begin with the Start Shape (containing the inbound Connector) on the left, a number of Execution and Logic Shapes in the middle, and often ends with one or more outbound Connectors on the right at a Stop shape. Example Shape Types are:

- Start Shape: processing begins in the Start Shape that is supplied in each new Process. An inbound Connector is embedded in the Start Shape to extract the data for further processing.
- Execution Shapes: transport and manipulate the data being passed through the Process.
- Logic Shapes: control the processing path of the data being passed through the Process.
- Stop Shape: An execution path built in a Process ends where a Stop Shape is defined.

The following tables provide additional detail about each example type of shape.

In Table 1, special shapes provide the shape symbol for the special shapes that may be included in an embodiment of an integrated business process, the name of the shapes and a description of the shapes.

TABLE 1

| | | Special Shapes |
|---|---|---|
|  | Start | The Start shape is the initial shape that begins a Process. It may be automatically included in a new Process and not be removed. |

In Table 2, execution shapes provides the shape symbol for the execution shapes that may be included in an integrated business process embodiment, the name of the shapes and a description of the shapes.

TABLE 2

| | Execution Shapes | |
|---|---|---|
| | Execution shapes manipulate the document data. | |
|  | Connector | Gets data into a Process or sends data out of a Process using one of the application or data source Connectors. |
|  | Trading Partner | Gets data into a Process or sends data out of a Process for a specific Trading Partner and handles common EDI document frameworks such as X12. |
|  | Map | Transforms data from one format (Profile) to another. |
|  | Set Properties | Sets Connector-specific properties (such as Disk file name, FTP directory, Mail subject, etc.) for Documents as well as global Process properties. |
|  | Message | Generates free-flow text messages with both static and dynamic content. |
|  | Notify | Creates a custom notification that may appear in an RSS feed. |
|  | Program Command | Executes commands including calling database SQL and stored procedures and invoking command line scripts. |
|  | Process Call | Executes another Process from within a Process or passes Document data to another Process for further execution. |
|  | Data Process | Manipulates data with one or more processing steps, including document splitting, zip/unzip, and custom scripting. |
|  | Find Changes | Tracks changes made to system files and sends the document results down an Add, Update or Delete path. |

In Table 3, logic shapes provides the shape symbol for the logic shapes that may be included in an embodiment of an integrated business process, the name of the shapes and a description of the shapes.

TABLE 3

| | Logic Shapes | |
|---|---|---|
| | Logic shapes direct the flow of documents through a process. | |
|  | Branch | Creates a copy of a Document and passes it down each branch in sequential order. A branch is executed to completion before the next branch is executed. If a Document errors on one branch it will not continue down subsequent branches. |
|  | Route | Routes Documents conditionally down different paths based on some value. Routing values can be static or dynamically pulled from Document Properties or actual document data. |
|  | Cleanse | Repairs or rejects Documents by validating field-level restrictions defined by the data Profile. |
|  | Decision | Routes Documents based on a true/false comparison of two values. Comparison values can be static or dynamically pulled from Document Properties or actual document data. |
|  | Exception | Terminates the Document execution and generates a user-defined error. |

TABLE 3-continued

Logic Shapes
Logic shapes direct the flow of documents through a process.

| | | |
|---|---|---|
| | Stop | Ends the current execution path without generating an error. |
| | Return Documents | Returns the documents to the calling source point. |
| | Flow Control | Controls document data flow and system resource management |

The customized executable system integration software application elements monitor and gather detailed status and error information including, for example: the business process integration start time; the business process integration running time; overall process errors, detailed error messages for each error, an error type for each error, context information associated with each error, and several other factors identifying business processes. This data is made part of the integrated business process execution record.

Table 4 shows example types of monitored and gathered detailed status and error information that may be included in an integrated business process execution record.

TABLE 4

| FIELD | DESCRIPTION |
|---|---|
| Execution ID | Unique identifier assigned to the execution |
| Account ID | Unique identifier assigned to the user or the enterprise |
| Atom ID and Name | Name and number ID assigned to the integrated business process at the location |
| Atom Local ID | ID number of the local location within the cloud hosting the integrated business process |
| Date Group | The day the integrated business process ran |
| Deployment ID | A unique identifier pointing to the version of the integrated business process |
| Elapsed Time | Duration of time it took to run the integrated business process |
| Error | A brief error message, if applicable |
| Error Count | The number of documents that had errors |
| Detailed Error Message List | A list containing an entry for each error message that occurred during the execution of this integrated business process event. |
| Integrated Business Process System Error Context Information List | A list containing an entry for the Integrated business process system error context information for each integrated business process system error and associated error message that occurred during the execution of this integrated business process event. |
| Process ID and Name | Name and unique identifier of the integrated business process |
| Original Execution ID | Applicable if this execution was a retry of a previous execution; unique identifier of the previous execution |
| Retry Flag and Count | Status as a retry and how many |
| Start Step Information | ID, action, name, type, etc. |
| Status | Success, error, or pending |
| Top Level Process ID | If this is a sub integrated business process, ID number of the top integrated business process |

The integrated business process execution record should at least include the following monitored and gathered detailed status and error information: the Process ID, the Error, the Detailed Error Message List, the Integrated Business Process System Error Context Information List, and the Status.

In one embodiment, the multi-user community terms database, the multi-user community scrubbed system error data base, the multi-user community integrated business process execution history database and the resolution article moderator queue are located at a common location such as in the Service provider's network 80. In another embodiment, the databases could be maintained within the enterprise network 90 or hosted externally.

The capability to receive a search request from a user for an error message for an integrated business process system error, the capability to scrub the error message to create a scrubbed error message for removing user specific information and to allow similar errors to be grouped by common error text, the capability to search a multi-user community scrubbed system error database for scrubbed resolution articles using the scrubbed error message, the capability to display the scrubbed resolution articles found in rank-order, the capability to receive user feedback on the effectiveness of the scrubbed resolution articles found, and the capability for a user to contribute a resolution article for the error message are accomplished via an error resolution graphical user interface provided with an Integration Process Management System. The error resolution graphical user interface may be displayed within a web browser window.

The system for resolving integrated business process system errors with an error resolution graphical user interface may be configured in accordance with the present disclosure to provide web server functionality for presenting a user-accessible website. Communications between the user device 20 and the system 80 website may be performed using conventional communications technologies, such as the HTTPS protocol. The website may be specially configured to provide a graphical user interface on service provider server/system 80 (display not shown) providing a service provider the error resolution graphical user interface permitting a user to search the multi-user community scrubbed system error database for scrubbed resolution articles for an integrated business process system error using a scrubbed error message. The error resolution graphical user interface in the presently described embodiment is used by the user of the service provider, but may be used by different enterprises, or service providers, or even trading partners. In the current embodiment, information and computer executable instructions for presenting such an error resolution graphical user interface are stored in a memory of the service provider server/system 80.

Figure 3:
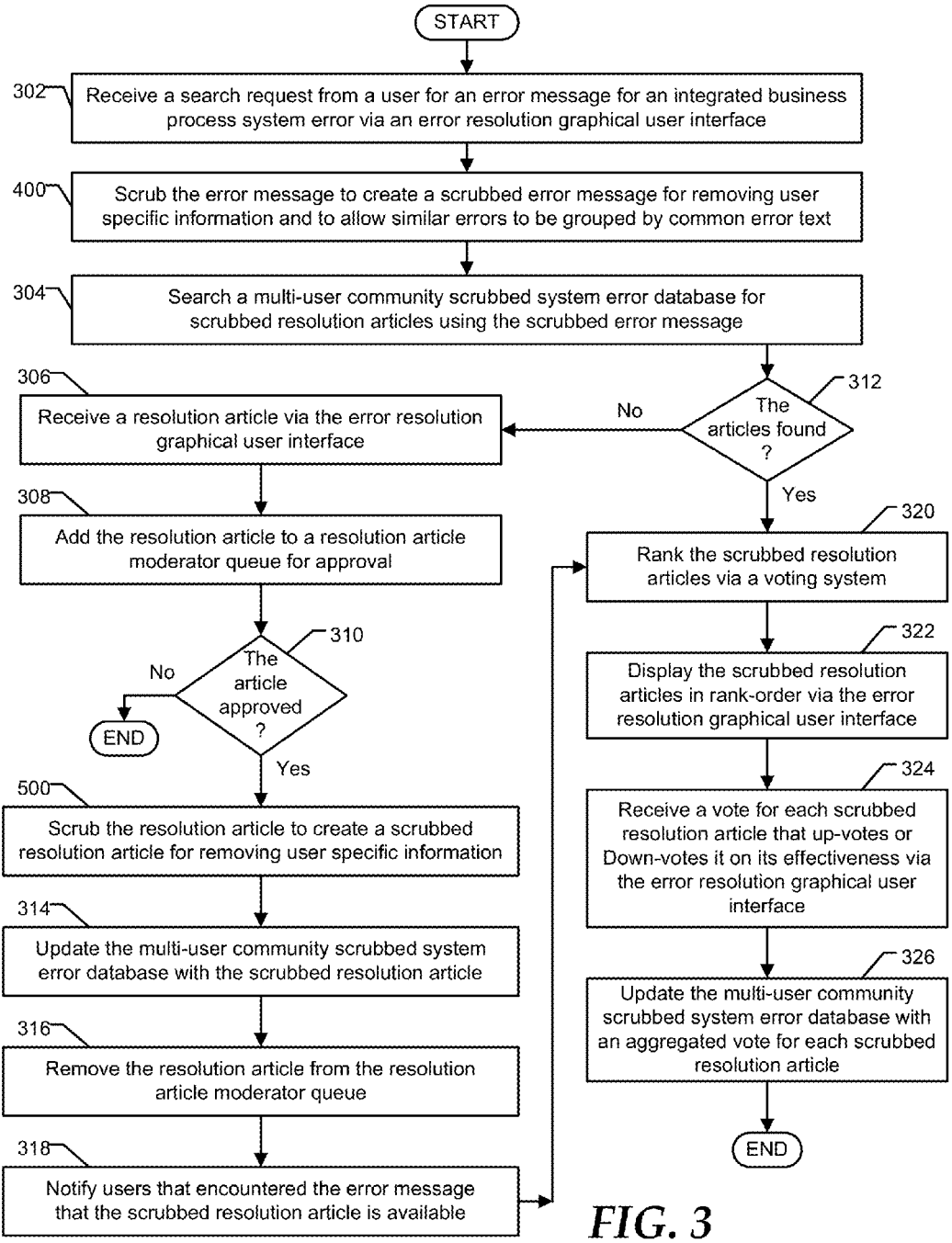
FIG. 3 is a flow diagram illustrating an error resolution search method according to an embodiment of the present disclosure.

FIG. 3 shows an error resolution search method 300 in accordance with an embodiment of the present disclosure for resolving integrated business process system errors at a given location. The flow begins at block 302 where the exemplary method receives, via the processor interface device, a search request from a user for an error message for an integrated business process system error via an error resolution graphical user interface via a video display device. The error message may have been collected from the elements of a customized executable system integration software application related to a deployed integrated business process. The user may have selected the error message from an integrated business process execution record for an integrated business process event contained in the user's integrated business process execution history database. Alternatively, the error message provided by the user may have been displayed by a debugger graphical user interface during the execution and debug of an integrated business process event.

The flow proceeds to block 400 where the method scrubs, via the processor, the error message to create a scrubbed error message for removing user specific information and to allow similar errors to be grouped by common error text. An embodiment of the error message scrubbing method is further described below in connection with FIG. 4. The flow proceeds to block 304 where the method transmits, via the processor interface device, a search request to a multi-user community scrubbed system error database for scrubbed resolution articles using the scrubbed error message. In one example embodiment, searching the multi-user community scrubbed system error database includes searching based on integrated business process system error context information associated with the scrubbed error message.

In this example embodiment, the method searches the multi-user community scrubbed system error database for scrubbed resolution articles. The search of other databases in addition to the multi-user community scrubbed system error database are contemplated including external developer forums, wikis, blogs and application developers' support repositories accessible by the communications network 50, such as the web based internet and internal forums, wikis, blogs, internal application developers' support repositories and document repositories located within the enterprise and accessible by the enterprise systems network 90. The search of one or more external and internal databases using the scrubbed error message and associated context information can be implemented using the Apache SOLR open source enterprise search platform from the Open Source Apache Software Foundation Lucene project.

The flow proceeds to block 312 where the method determines and receives, via the processor interface device, if one or more scrubbed resolution articles were found by the search. If one or more scrubbed resolution articles were found by the search, the flow proceeds to block 320 where the method ranks, via the processor, the scrubbed resolution articles via a voting system. The flow proceeds to block 322 where the method displays the scrubbed resolution articles in rank-order via the error resolution graphical user interface via the video display device. The flow proceeds to block 324 where the method receives, via the processor interface device, a vote from the user via the error resolution graphical user interface via the video display device that up-votes or down-votes for each scrubbed resolution article based on its effectiveness in resolving the integrated business process system error. The flow proceeds to block 326 where the method transmits, via the processor interface device, an update request to the multi-user community scrubbed system error database with an aggregated vote for each scrubbed resolution article for the scrubbed error message for the integrated business process system error.

If a scrubbed resolution article was not found by the search, the flow proceeds to block 306 where the method receives, via the processor interface device, a submitted resolution article from the user via the error resolution graphical user interface via the video display device.

The flow proceeds to block 308 where the method transmits, via the processor interface device, a request to add the submitted resolution article to a resolution article moderator queue for approval by a community of experts. The flow proceeds to block 310 where the method receives and determines, via the processor interface device, if the submitted resolution article was approved by the community of experts.

If the submitted resolution article was approved by the community of experts, the flow proceeds to block 500 where the method scrubs the submitted resolution article to create a scrubbed submitted resolution article for removing user specific information. An example embodiment of the resolution article scrubbing method is found below in connection with FIG. 5. The flow proceeds to block 314 where the method transmits, via the processor interface device, an update request to the multi-user community scrubbed system error database with the scrubbed submitted resolution article for the scrubbed error message for the integrated business process system error. In this example embodiment, the scrubbed submitted resolution article is added to the multi-user community scrubbed system error database. Other databases are contemplated including creating a scrubbed resolution article database in Saleforce.com's Salesforce Service cloud, accessed via the communications network 50, instead of or in addition to the multi-user community scrubbed system error database. The flow proceeds to block 316 where the method removes the submitted resolution article from the resolution article moderator queue. The flow proceeds to block 318 where the method notifies, via the processor interface device, users that encountered the error message that the scrubbed submitted resolution article is available. In this example embodiment, a list of users that encountered the error message is maintained in the multi-user community scrubbed system error database for the scrubbed error message and used by the method for the notification. Other databases are contemplated including maintaining the list of users that encountered the error message in Saleforce.com's Salesforce Service cloud. In this example embodiment, as an option, the flow proceeds from block 318 to block 320 and the flow proceeds as before as described above. In another embodiment, at block 318, the flow ends and the error resolution search method completes.

If the submitted resolution article is not approved by the community of experts, the method (not shown) removes the submitted resolution article from the resolution article moderator queue and notifies the user that submitted the submitted resolution article that the submitted resolution article was not approved and the reason why it was not approved.

In this example embodiment, as an option, the flow proceeds from block 304 to block 306 and the flow proceeds as before. This option of the example embodiment allows the user to contribute a submitted resolution article for an error message independent of whether another scrubbed resolution article exists or not. The contribution of a submitted resolution article by the user may be a more effective resolution than already exists and increases the body of knowledge around the integrated business process system error and similar system errors.

Figure 4:
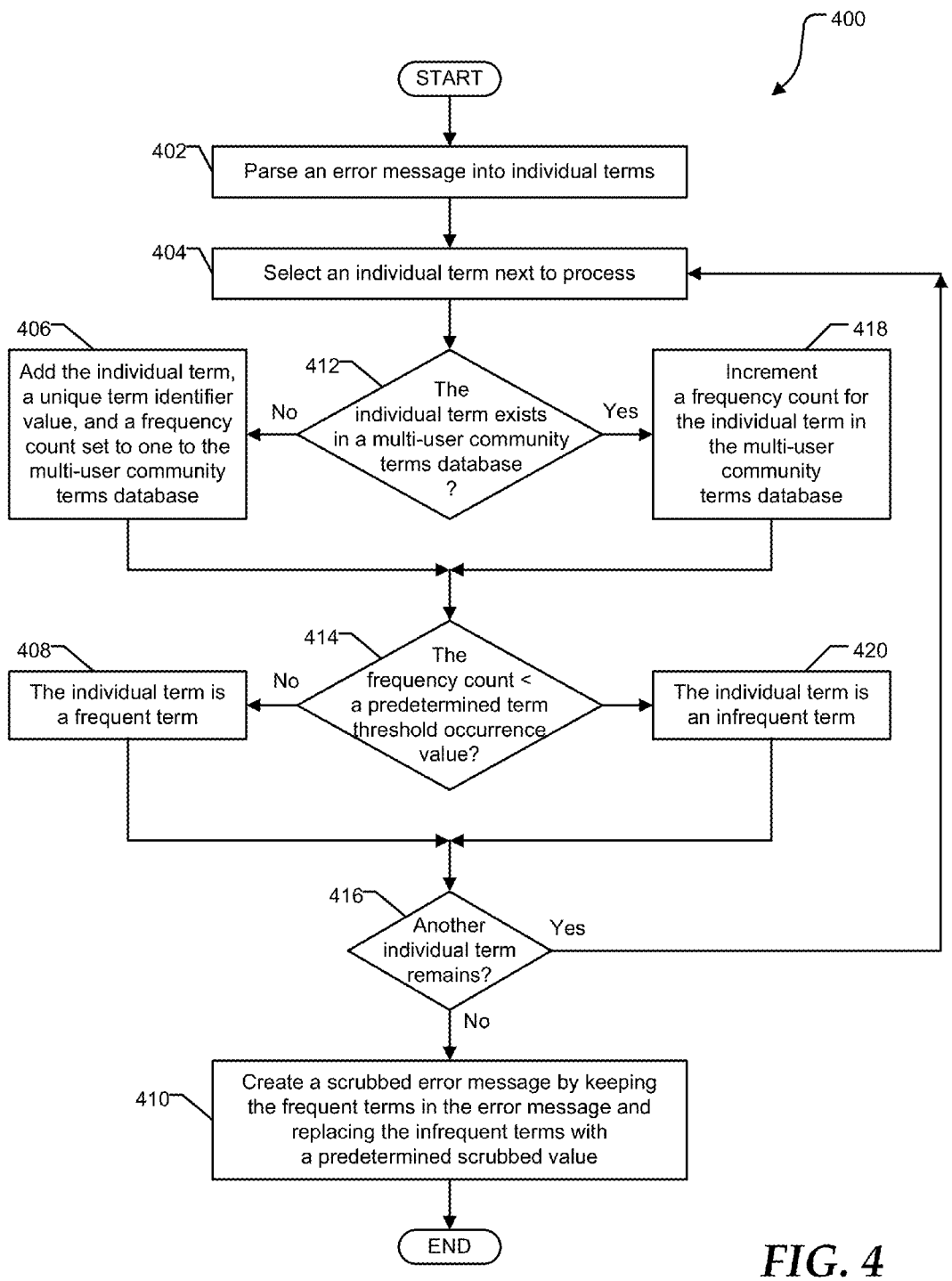
FIG. 4 is a flow diagram illustrating an error message scrubbing method according to an embodiment of the present disclosure.

FIG. 4 shows an error message scrubbing method 400 in accordance with an embodiment of the present disclosure. The method 400 shows an embodiment for scrubbing an error message to create a scrubbed error message for removing user specific information and to allow similar errors to be grouped by common error text. A non-exhaustive list of user specific information includes detailed account information, user identifications; a user's integrated business process specific structural information and other user-specific, user sensitive information. This non-exhaustive list of user specific information may include other information, for example, financial data involving a transaction failure. An example of a user's integrated business process specific structural information may include names of various internal applications and trading partners. The user integrated business process specific structural information may be identified and removed as it is not pertinent to the error and is not required to identify a resolution to an integrated business process system error. Removing this information also allows similar scrubbed error messages to be grouped by common error text and may result in the identification of multiple resolutions for these similar scrubbed error messages. The error message is parsed into individual terms.

In this embodiment, the individual terms in an error message, a string of text, are identified by a process called tokenization. Tokenization breaks the error message, text string, into words, phrases, symbols or other meaningful elements called tokens. This list of tokens is input into the parsing process. Parsing is the process of analyzing a string of symbols (tokens) either in natural language or in computer languages according to the rules of a formal grammar. The Parser assigns the non-blank and non-punctuation characters individual token to an individual term. In the present embodiment, during parsing of the error message, blanks and punctuation are identified and removed from consideration as individual terms. Alternatively, other individual terms may also be removed from consideration as an individual term, for example, arithmetic operators. Each individual term is analyzed to determine if the individual term is a frequent term or an infrequent term. The scrubbed error message is created by keeping the frequent terms in the error message and replacing the infrequent terms with a predetermined scrubbed value. In this example embodiment, the predetermined scrubbed value is a string of X characters, 'XXXXX.' Other predetermined scrubbed values are possible, for example, using a string of underscore characters, '_____' to indicate the infrequent term was replaced.

The analysis of each individual term to determine if it is a frequent term or an infrequent term utilizes a multi-user community terms database. The multi-user community terms database has an entry for each unique individual term based on a history of previously encountered individual terms within error messages and resolution articles. Analysis of individual terms within a resolution article will be described in the detailed description for FIG. 500. The entry for each unique individual term comprises the individual term and a frequency count indicating the number of times the individual term has previously been encountered within error messages and resolution articles. If an individual term is unique and has not been previously encountered, the individual term does not exist in the database, the individual term and a frequency count initialized to one is added to the multi-user community terms database. If the individual term has been previously encountered, the individual term exists in the database, its frequency count is incremented in the multi-user community terms database. The analysis of the individual term then determines if the frequency count for the individual term is less than a predetermined term threshold occurrence value. If the frequency count for the individual term is less than a predetermined term threshold occurrence value, then the individual term is an infrequent term. Otherwise, the individual term is a frequent term. In this example embodiment, the multi-user community terms database is located with the service provider 80. Other storage locations are contemplated including a database maintained within the enterprise network 90 instead or in addition to a database at the service provider 80.

The following example shows how the individual terms in an error message are analyzed and processed. Given the example error message:

"Error occurred with column 'myColumn', field is too long"

An example of a partial multi-user community terms database for the example error message is depicted in Table 5.

TABLE 5

| Individual Term | Frequency Count |
|---|---|
| Error | 1000 |
| occurred | 1000 |
| with | 4000 |
| column | 3000 |
| myColumn | 5 |
| field | 1000 |
| is | 4000 |
| too | 2000 |
| long | 300 |

A calculation across the individual terms in the example error message shows that the individual term 'myColumn' only appears 5 times in the multi-user community terms database, and may indicate that the individual term is an infrequent term and would be a candidate for removal. The other individual terms in the example error message have a significantly higher frequency count, and may indicate that these individual terms are frequent terms and should be kept in the example error message. The resulting scrubbed error message would then be:

"Error occurred with column 'XXXXX', field is too long"

Note, that the blanks and punctuation identified during parsing, though not considered candidates for individual terms, are maintained in the resulting scrubbed error message.

The flow begins at block 402 where the exemplary error message scrubbing method parses an error message into individual terms. The flow proceeds to block 404 where the method selects the individual term next to process. The flow proceeds to block 412 where the method determines if the individual term exists in a multi-user community terms database. If the individual term exists, the flow proceeds to block 418 where the method increments a frequency count and sets a last updated value to the current date and time for the individual term in the multi-user community terms database. The flow proceeds to block 414 where the method determines if the frequency count for the individual term is less than a predetermined term threshold occurrence value. The term threshold occurrence value criterion may range from an assessment of immediately recent frequency counts for individual term occurrence to occurrence over months or even years. The term threshold occurrence value may be customizable, for example it may be based on what a community of experts concludes is the proper value that results in individual terms that are part of the user specific information being removed and individual terms that are not part of the user specific information being kept. Alternatively, the term threshold occurrence value may be set or adjusted by a service provider or user.

If the frequency count for the individual term is less than the predetermined term threshold occurrence value, the flow proceeds to block 420 where the method indicates that the individual term is an infrequent term. The flow proceeds to block 416 where the method determines if another individual term remains to process. If another individual term remains to process, the flow proceeds back to block 404 to select the individual term next to process as previously described. If another individual term does not remain to process, the flow proceeds to block 410 where the method creates a scrubbed error message by keeping the frequent terms in the error message and replacing the infrequent terms with a predetermined scrubbed value. In one example embodiment, the criterion the method uses for keeping the frequent terms in the error message and replacing the infrequent terms in the error message also includes utilizing a dictionary of individual terms that indicates whether an individual term is acceptable or unacceptable to keep in an error message. The method may utilize this dictionary in determining individual terms that are to be kept or individual terms to be replaced or both. For example, a client name may be automatically deemed for removal. The method may utilize this dictionary in addition to determining if an individual term is an infrequent term or an infrequent term or may utilize this dictionary exclusively. The individual term dictionary may be created based on an analysis and assessment of immediately recent individual terms previously encountered back to months or even years. The individual terms dictionary may be customizable, for example it may be created based on what a community of experts concludes are the proper sets of acceptable and unacceptable individual terms that results in individual terms that is part of one user's specific information being removed and individual terms that are not part of that user's specific information being kept. In this way, terms more relevant to the error are kept to match with a resolution article. Alternatively, the term dictionary may be created or adjusted by a service provider or user.

At block 412, if the individual term does not exist in a multi-user community terms database, the flow proceeds to block 406 where the method adds the individual term, a unique term identifier value, a frequency count set to one, and a last updated value set to the current date and time for the individual term to the multi-user community terms database. The flow proceeds to block 414 where the method determines if the frequency count for the individual term is less than a predetermined term threshold occurrence value as previously described.

If the frequency count for the individual term is equal or greater than the predetermined term threshold occurrence value, the flow proceeds to block 408 where the method indicates that the individual term is a frequent term. The flow proceeds to block 416 where the method determines if another individual term remains to process. If another individual term remains to process, the flow proceeds back to block 404 to select the individual term next to process as previously described. If another individual term does not remain to process, the flow proceeds to block 410 where the method creates a scrubbed error message by keeping the frequent terms in the error message and replacing the infrequent terms with a predetermined scrubbed value as described above.

In another embodiment (not shown), the multi-user community terms database may be periodically checked to remove each individual term that is an infrequent term and has not been recently updated. The individual term can be removed if the frequency count is less than a predetermined term threshold occurrence value and the last updated value is equal or greater than a predetermined term time limit value. This may help with identifying infrequent terms. The individual term time limit value criterion may be set to remove infrequent terms that have not been updated within the last two weeks. This individual term time limit value may be set to a different value. The individual term time limit value criterion may range from an assessment of immediately recent infrequent terms' last updated values previously encountered to months or even years. The individual term time limit value may be customizable, for example it may be based on what the community of experts concludes is a value just above the normal frequency for infrequent terms to be updated that results in removing infrequent terms from the multi-user community terms database that are part of the user specific information being removed and individual terms that are not part of the user specific information being kept. Alternatively, the individual term time limit value may be set or adjusted by a service provider or user.

In another embodiment (not shown), the method uses a scrubbed error message process table to determine if the individual terms from the scrubbed error message have already been submitted and recorded for this process that generated the scrubbed error message. This determination is used to prevent the duplication of data in the multi-user community terms database.

In this other embodiment, the error message scrubbing method 400, as shown in FIG. 4 is modified slightly to incorporate the scrubbed error message process table. The flow of the modified method proceeds the same as the flow of method 400 up to block 412, where the modified method determines if the individual term exists in a multi-user community terms database. If the individual term exists in a multi-user community terms database, instead of the flow proceeding from block 412 to block 418, the flow of the modified method proceeds to block 414, eliminating the update to the frequency count for the individual term. The flow of the modified method then proceeds the same as the flow of method 400 up to where the flow ends. Instead of the flow ending, the flow proceeds to where the modified method determines if the scrubbed error message has already been submitted for this process. The modified method makes this determination by comparing a process id submitted with the error message to the modified scrubbing method to process ids previously recorded in a process table for the scrubbed error message in the multi-user community scrubbed system error database. A comparison resulting in a match indicates that the scrubbed error message has already been submitted for this process. If the modified method determines that the scrubbed error message has already been submitted for this process, the flow of the modified method ends, preventing the frequency count for the individual terms from the error message from increasing due to a duplicate scrubbed error message generated by the same process. If the modified method determines that the scrubbed error message has not already been submitted for this process, the flow proceeds to where the modified method increments the frequency count and sets the last updated value to the current date and time for each individual term from the error message in the multi-user community terms database.

Figure 5:
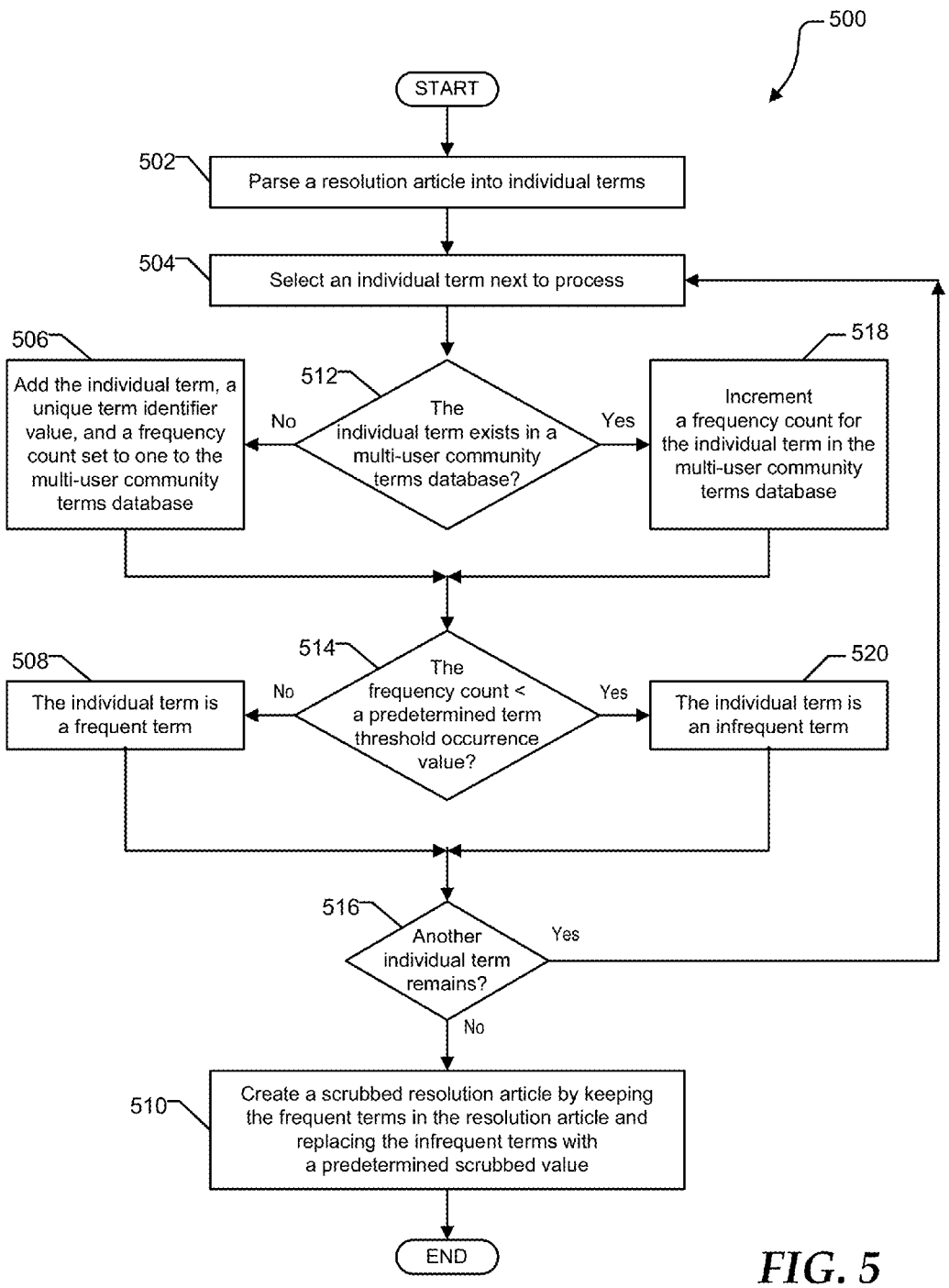
FIG. 5 is a flow diagram illustrating a resolution article scrubbing method according to an embodiment of the present disclosure.

FIG. 5 shows a resolution article scrubbing method 500 in accordance with an embodiment of the present disclosure. The method 500 shows an embodiment for scrubbing a resolution article to create a scrubbed resolution article for removing user specific information. In this example embodiment the user specific information, similar to that previously described in the error message scrubbing method 400, includes detailed account information, user identifications, a user's integrated business process specific structural information and other user-specific information, user sensitive information. This non-exhaustive list of user specific information may include other information, for example, financial data involving a transaction failure. An example of a user's integrated business process specific structural information may include names of various internal applications and trading partners. This user integrated business process specific structural information may be identified and removed as it is not required to be a part of a resolution article for an integrated business process system error. The resolution article is parsed into individual terms. In the present embodiment, during parsing of the resolution article, blanks and punctuation are identified and removed from consideration as individual terms. Alternatively, other individual terms may also be removed from consideration as an individual term, for example, arithmetic operators. This is similar to the error message scrubbing method previously described in connection with FIG. 4. See the detailed discussion above regarding parsing, tokenization and tokens in connection with FIG. 4. Each individual term is analyzed to determine if the individual term is a frequent term or an infrequent term. The scrubbed resolution article is created by keeping the frequent terms in the resolution article and replacing the infrequent terms with a predetermined scrubbed value. In this example embodiment, similar to the exemplary error message scrubbing method 400, the predetermined scrubbed value is a string of X characters, 'XXXXX.' Other predetermined scrubbed values are possible, for example, using a string of underscore characters, '_____' to indicate the infrequent term was replaced.

The analysis of each individual term to determine if it is a frequent term or an infrequent term utilizes a multi-user community terms database. The multi-user community terms database has an entry for each unique individual term based on a history of previously encountered individual terms within error messages and resolution articles. Analysis of individual terms within an error message was described above in connection with FIG. 4. In this example embodiment, both the exemplary error message scrubbing method 400 and the exemplary resolution article scrubbing method 500 utilize the same multi-user community terms database. In another embodiment, each scrubbing method may utilize and maintain separate multi-user community terms databases. The criterion for having a multi-user community terms database for each scrubbing method may range from an assessment of the frequency that individual terms occur in immediately recent error messages and resolution articles previously encountered to months or even years. Utilizing a shared or separate multi-user community terms databases may be customizable, for example it may be based on what a community of experts concludes are the similarities and differences in the individual term occurrence frequencies in error messages and resolution articles and whether the differences warrant separate databases or not. Alternatively, the shared or separate multi-user community terms databases may be created by or adjusted by a service provider or a user. In this example embodiment, the entry for each unique individual term comprises the individual term and a frequency count indicating the number of times the individual term has previously been encountered within error messages and resolution articles. If an individual term is unique and has not been previously encountered, the individual term does not exist in the database, the individual term and a frequency count initialized to one is added to the multi-user community terms database. If the individual term has been previously encountered, the individual term exists in the database, its frequency count is incremented in the multi-user community terms database. The analysis of the individual term then determines if the frequency count for the individual term is less than a predetermined term threshold occurrence value. If the frequency count for the individual term is less than a predetermined term threshold occurrence value, then the individual term is an infrequent term. Otherwise, the individual term is a frequent term. In this example embodiment, the multi-user community terms database is located with the service provider 80. Other storage locations are contemplated including a database maintained within the enterprise network 90 instead or in addition to a database at the service provider 80.

The flow begins at block 502 where the exemplary resolution article scrubbing method parses a resolution article into individual terms. The flow proceeds to block 504 where the method selects the individual term next to process. The flow proceeds to block 512 where the method determines if the individual term exists in a multi-user community terms database. If the individual term exists, the flow proceeds to block 518 where the method increments a frequency count and sets a last updated value to the current date and time for the individual term in the multi-user community terms database. The flow proceeds to block 514 where the method determines if the frequency count for the individual term is less than a predetermined term threshold occurrence value. Similar to the error message scrubbing method 400, the term threshold occurrence value criterion may range from an assessment of immediately recent frequency counts for individual term occurrence back to months or even years. The term threshold occurrence value may be customizable, for example it may be based on what the community of experts concludes is the proper value that results in individual terms that are part of the user specific information being removed and individual terms that are not part of the user specific information being kept. Alternatively, the term threshold occurrence value may be created by set or adjusted by a service provider or a user.

If the frequency count for the individual term is less than the predetermined term threshold occurrence value, the flow proceeds to block 520 where the method indicates that the individual term is an infrequent term. The flow proceeds to block 516 where the method determines if another individual term remains to process. If another individual term remains to process, the flow proceeds back to block 504 to select the individual term next to process as previously described. If another individual term does not remain to process, the flow proceeds to block 510 where the method creates a scrubbed resolution article by keeping the frequent terms in the resolution article and replacing the infrequent terms with a predetermined scrubbed value. In one example embodiment, the criterion the method uses for keeping the frequent terms in the resolution article and replacing the infrequent terms in the resolution article also includes utilizing a dictionary of individual terms that indicates whether an individual term is acceptable or unacceptable to keep in a resolution article. The method may utilize this dictionary in determining individual terms that are to be kept or individual terms to be replaced or both. The method may utilize this dictionary in addition to determining if an individual term is an infrequent term or an infrequent term or may utilize this dictionary exclusively. The individual term dictionary may be created based on an analysis and assessment of immediately recent individual terms previously encountered back to months or even years. The individual terms dictionary may be customizable, for example it may be created based on what the community of experts concludes are the proper sets of acceptable and unacceptable individual terms that results in individual terms that is part of one user's specific information being removed and individual terms that are not part of that user's specific information being kept. Alternatively, the individual terms dictionary may be created by or adjusted by a service provider or a user.

At block 512, if the individual term does not exist in a multi-user community terms database, the flow proceeds to block 506 where the method adds the individual term, a unique term identifier value, a frequency count set to one, and a last updated value set to the current date and time for the individual term to the multi-user community terms database. The flow proceeds to block 514 where the method determines if the frequency count for the individual term is less than a predetermined term threshold occurrence value as previously described.

If the frequency count for the individual term is equal or greater than the predetermined term threshold occurrence value, the flow proceeds to block 508 where the method indicates that the individual term is a frequent term. The flow proceeds to block 516 where the method determines if another individual term remains to process. If another individual term remains to process, the flow proceeds back to block 504 to select the individual term next to process and the flow proceeds as previously described. If another individual term does not remain to process, the flow proceeds to block 510 where the method creates a scrubbed resolution article by keeping the frequent terms in the resolution article and replacing the infrequent terms with a predetermined scrubbed value as described above.

In another embodiment (not shown), the multi-user community terms database may be periodically checked to remove each individual term that is an infrequent term and has not been recently updated. The individual term can be removed if the frequency count is less than a predetermined term threshold occurrence value and the last updated value is equal or greater than a predetermined term time limit value. This may help with identifying infrequent terms. The individual term time limit value criterion may be set to remove infrequent terms that have not been updated within the last two weeks. This individual term time limit value may be set to a different value. The individual term time limit value criterion may range from an assessment of immediately recent infrequent terms' last updated values previously encountered to months or even years. The individual term time limit value may be customizable, for example it may be based on what the community of experts concludes is a value just above the normal frequency for infrequent terms to be updated that results in removing infrequent terms from the multi-user community terms database that is part of one user's specific information being removed and individual terms that are not part of that user's specific information being kept. Alternatively, the individual term time limit value may be set or adjusted by a service provider or a user.

In another embodiment (not shown), the method uses a scrubbed resolution article process table to determine if the individual terms from the scrubbed resolution article have already been submitted and recorded for this process associated with the scrubbed resolution article. This determination is used to prevent the duplication of data in the multi-user community terms database.

In this other embodiment, the resolution article scrubbing method 500 shown in FIG. 5 is modified slightly to incorporate the scrubbed resolution article process table. The modifications are described with reference to FIG. 5. The flow of the modified method proceeds the same as the flow of method 500 up to block 512, where the modified method determines if the individual term exists in a multi-user community terms database. If the individual term exists in a multi-user community terms database, instead of the flow proceeding from block 512 to block 518, the flow of the modified method proceeds to block 514, eliminating the update to the frequency count for the individual term. The flow of the modified method then proceeds the same as the flow of method 500 up to where the flow ends. Instead of the flow ending, the flow proceeds to where the modified method determines if the scrubbed resolution article has already been submitted for this process. The modified method makes this determination by comparing a process id submitted with the scrubbed resolution article to the modified scrubbing method to process ids previously recorded in a process table for the scrubbed resolution article in the multi-user community scrubbed system error database. A comparison resulting in a match indicates that the scrubbed resolution article has already been submitted for this process. If the modified method determines that the scrubbed resolution article has already been submitted for this process, the flow of the modified method ends, preventing the frequency count for the individual terms from the resolution article from increasing due to a duplicate scrubbed resolution article associated with the same process. If the modified method determines that the scrubbed resolution article has not already been submitted for this process, the flow proceeds to where the modified method increments the frequency count and sets the last updated value to the current date and time for each individual term from the resolution article in the multi-user community terms database.

Figure 6:
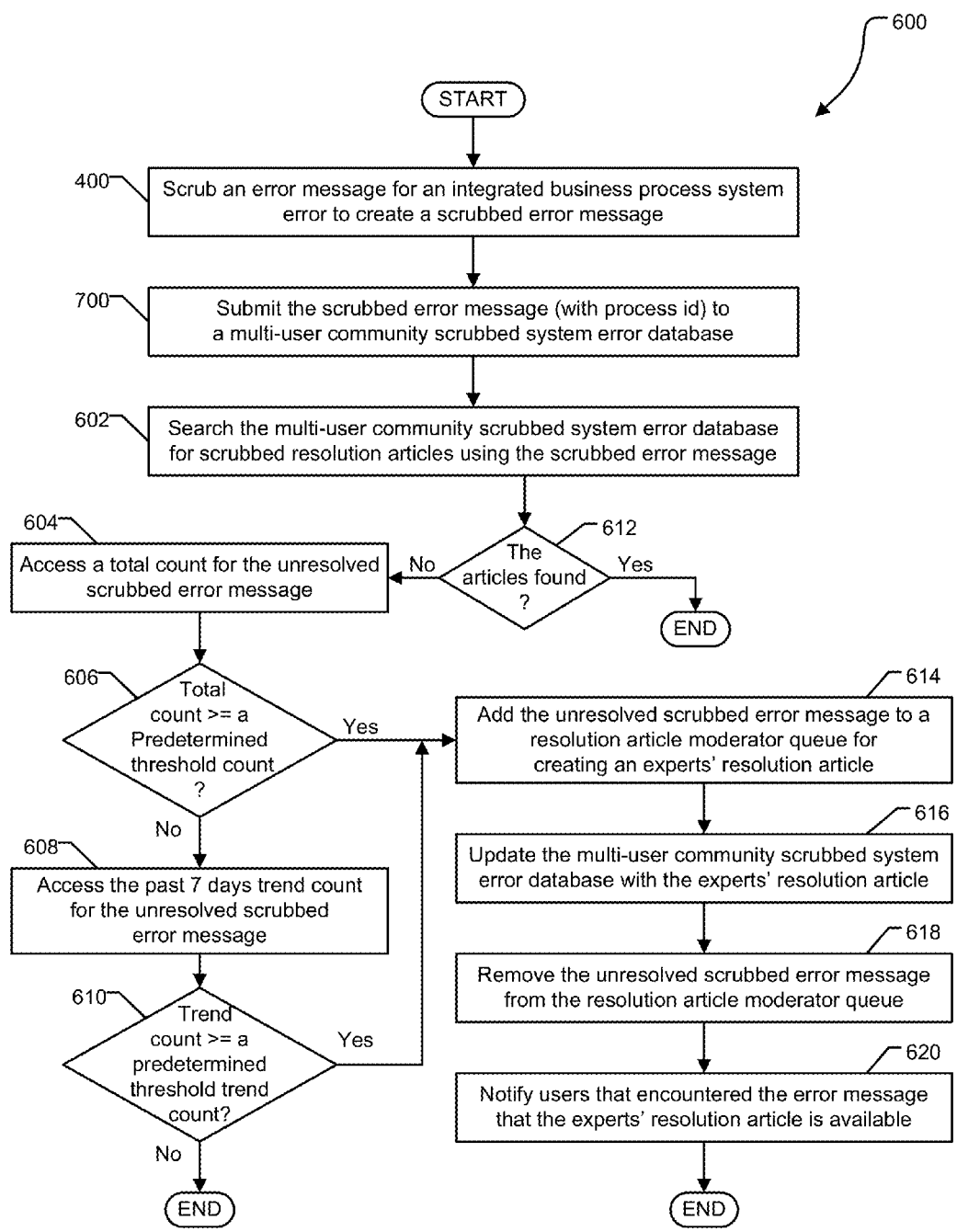
FIG. 6 is a flow diagram illustrating an error message resolution monitoring method according to an embodiment of the present disclosure.

FIG. 6 shows an error message resolution monitoring method 600 in accordance with an embodiment of the present disclosure. The exemplary method shows an embodiment for determining if an integrated business process system error has been resolved or not. Depending on whether the integrated business process system error has not been resolved, the method may access detailed monitoring information to determine if the number of occurrences of the unresolved integrated business process system error is too high or the occurrence rate is trending highly and requires attention. Depending on whether the integrated business process system error requires attention, the method may add it to a resolution article moderator queue for resolution by creating an experts' resolution article and notify users that encountered the error message that the experts' resolution article is available.

The flow begins at block 400 where the exemplary error message resolution monitoring method scrubs an error message for an integrated business process system error to create a scrubbed error message for removing user specific information and to allow similar errors to be grouped by common error text. This is described in an example embodiment in FIG. 4. The flow proceeds to block 700 where the method submits the scrubbed error message with process id to a multi-user community scrubbed system error database. Further discussion of the scrubbed error message monitoring method 700 is found below in an embodiment described with FIG. 7. The flow proceeds to block 602 where the method searches the multi-user community scrubbed system error database for scrubbed resolution articles using the scrubbed error message. The flow proceeds to block 612 where the method determines if one or more scrubbed resolution articles were found. If one or more scrubbed resolution articles were found, the flow ends as the scrubbed error message has a resolution. If a scrubbed resolution article was not found, the flow proceeds to block 604 where the method accesses a total count for the unresolved scrubbed error message from the multi-user community scrubbed system error database. The flow proceeds to block 606 where the method determines if the total count is equal or greater than a predetermined threshold count. The predetermined threshold count criterion may in one example embodiment determine whether the number of occurrences of the unresolved scrubbed error message has been equal to or greater than 5 times. The predetermined threshold count may be set to a different value. The predetermined threshold count criterion may range from an assessment of immediately recent unresolved scrubbed error messages occurrences to occurrences over months or even years. The predetermined threshold count may be customizable, for example it may be based on what the community of experts concludes is a frequency of occurrence for the unresolved scrubbed error messages that warrants investigation and resolution. Alternatively, the predetermined threshold count may be set or adjusted by a service provider or a user.

If the total count is equal or greater than the predetermined threshold count, the flow proceeds to block 614 where the method adds the unresolved scrubbed error message to a resolution article moderator queue for creating an experts' resolution article. The flow proceeds to block 616 where the method updates the multi-user community scrubbed system error database with the experts' resolution article. The flow proceeds to block 618 where the method removes the unresolved scrubbed error message from the resolution article moderator queue. The flow proceeds to block 620 where the method notifies users that encountered the error message that the experts' resolution article is available.

If the total count is less than the predetermined threshold count, the flow proceeds to block 608 where the method accesses a trend count for the past seven days for the unresolved scrubbed error message in the multi-user community scrubbed system error database. In this example embodiment, the trend count time window is set at seven days. This is the past time window that unresolved scrubbed error message trends should be monitored to avoid allowing problematic integrated business processes to go unnoticed and unresolved for too long. The trend count time window criterion may be set by the service provider or user to any time period. The trend count time window will depend on how critical the integrated business processes are, how often they are executed and the impact a problematic integrated business process has on an overall service provider's or user's business. Some integrated business processes are very critical to the overall business, others less so. Accordingly, the trend count time window will be shorter for more critical integrated business processes, that are executed frequently or that have a high impact on the service provider's or user's overall business.

The flow proceeds to block 610 where the method determines if the trend count is equal or greater than a predetermined threshold trend count. The threshold trend count criterion may in one example embodiment determine whether the frequency of occurrences within the time window of the unresolved scrubbed error message has been equal to or greater than 5 times indicating that the unresolved scrubbed error message is trending highly and requires attention and resolution. The threshold trend count may be set to a different value. The threshold trend count criterion may range from an assessment of immediately recent unresolved scrubbed error message frequency of occurrences within the time window back to months or even years. The threshold trend count may be customizable, for example it may be based on what the community of experts concludes is a frequency of occurrences within the time window for unresolved scrubbed error messages that indicates that the unresolved scrubbed error message is trending highly and warrants an investigation and resolution. Alternatively, the threshold trend count may be set or adjusted by a service provider or user.

If the trend count for the scrubbed error message is less than the predetermined threshold trend count, the flow ends as the unresolved scrubbed error message is not trending high enough to warrant an investigation or resolution. If the trend count for the unresolved scrubbed error message is equal or greater than the predetermined threshold trend count, the flow proceeds to block 614 where the method proceeds as described above.

Figure 7:
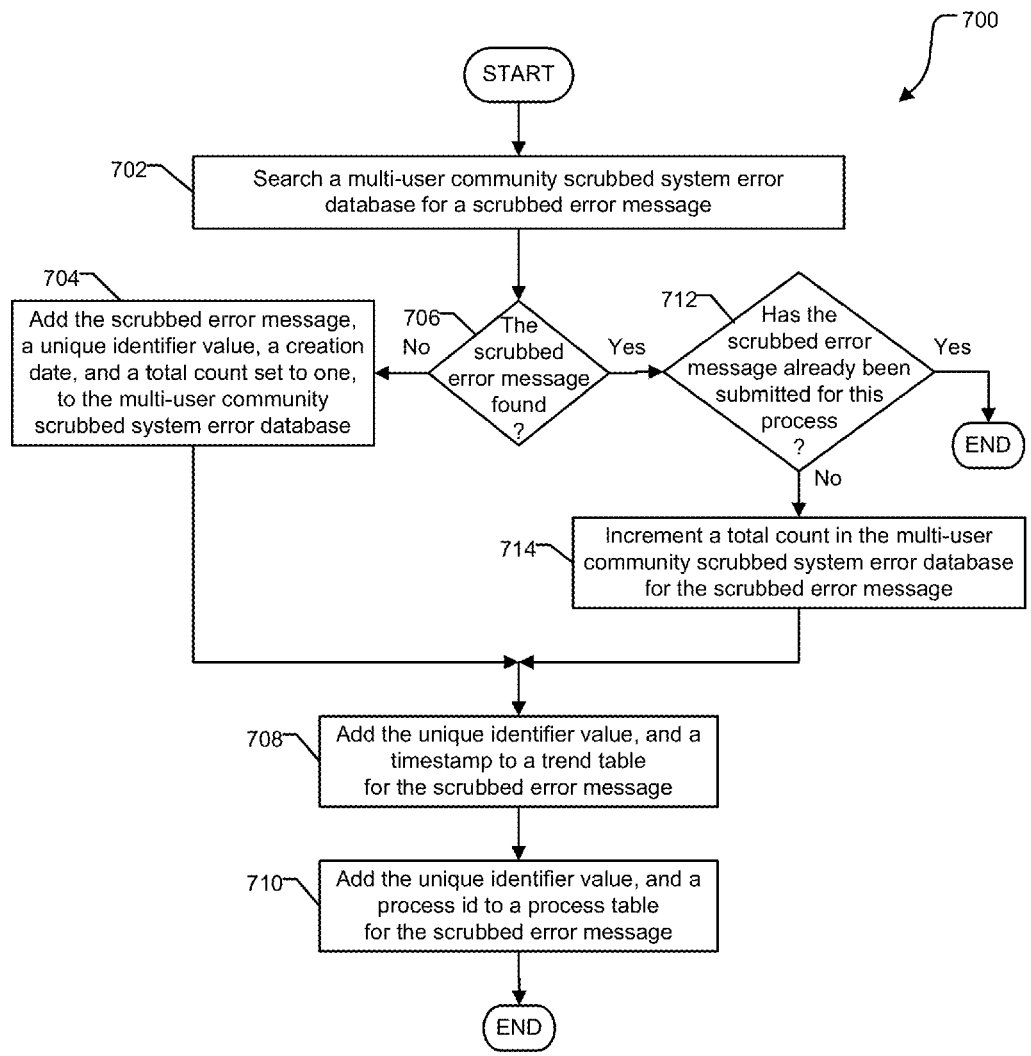
FIG. 7 is a flow diagram illustrating a scrubbed error message monitoring method according to an embodiment of the present disclosure.

FIG. 7 shows a scrubbed error message monitoring method 700 in accordance with an embodiment of the present disclosure. The scrubbed error message monitoring method 700 shows an embodiment for how a multi-user community scrubbed system error database can be updated with a scrubbed error message and associated data submitted to the database. The method maintains a process table for the scrubbed error message to prevent duplication of data associated with the same process that generated the scrubbed error message in the multi-user community scrubbed system error database. The method also shows how additional tracking data associated with the scrubbed error message is maintained in the database. The additional tracking data includes scrubbed error message activity that represents the activity of an integrated business process system error and similar system errors associated with the scrubbed error message in deployed integrated business processes. The activity data may reach a level that indicates that the integrated business process system error and similar system errors require attention and resolution. In this example embodiment, the multi-user community scrubbed system error database is located at a memory device with the service provider 80. Other storage locations are contemplated including a database maintained within the enterprise network 90 instead or in addition to a database at the service provider 80.

The flow begins at block 702 where the exemplary scrubbed error message monitoring method searches a multi-user community scrubbed system error database for a scrubbed error message. The flow proceeds to block 706 where the method determines if the scrubbed error message was found. If the scrubbed error message was found, the flow proceeds to block 712 where the method determines if the scrubbed error message has already been submitted for this process. If the scrubbed error message has already been submitted for this process, the flow ends, preventing duplication of data for the same process that generated the scrubbed error message in the database. If the scrubbed error message has not already been submitted for this process, the flow proceeds to block 714 where the method increments a total count for the scrubbed error message in the multi-user community scrubbed system error database. The total count tracks the number of times the scrubbed error message has been encountered in various different deployed integrated business processes. The flow proceeds to block 708 where the method adds the scrubbed error message's unique identifier value, and a timestamp set to the current time and date to a trend table for the scrubbed error message in the multi-user community scrubbed system error database. The timestamp records the time of the update to the scrubbed error message in the database. The trend table is a rolling table and only has entries for scrubbed error messages that have occurred within the past 7 days. Other time periods for the rolling trend table are also contemplated. Trend table entries that occurred earlier than that are removed based on the timestamp in the entry and the current time and date. The trend count is equal to the number of entries in the trend table for the scrubbed error message and tracks the activity trend for the scrubbed error message for the integrated business process system error and similar system errors encountered in various different deployed integrated business processes.

The flow proceeds to block 710 where the method adds the scrubbed error message's unique identifier value, and the process id, to a process table for the scrubbed error message in the multi-user community scrubbed system error database. The process id represents the process that generated this occurrence of the scrubbed error message.

At block 706, if the scrubbed error message was not found, the flow proceeds to block 704 where the method adds the scrubbed error message, a unique identifier value, a creation date set to the current date, and a total count set to one, to the multi-user community scrubbed system error database. The flow proceeds to block 708 where the method proceeds as previously described above.

Figure 8:
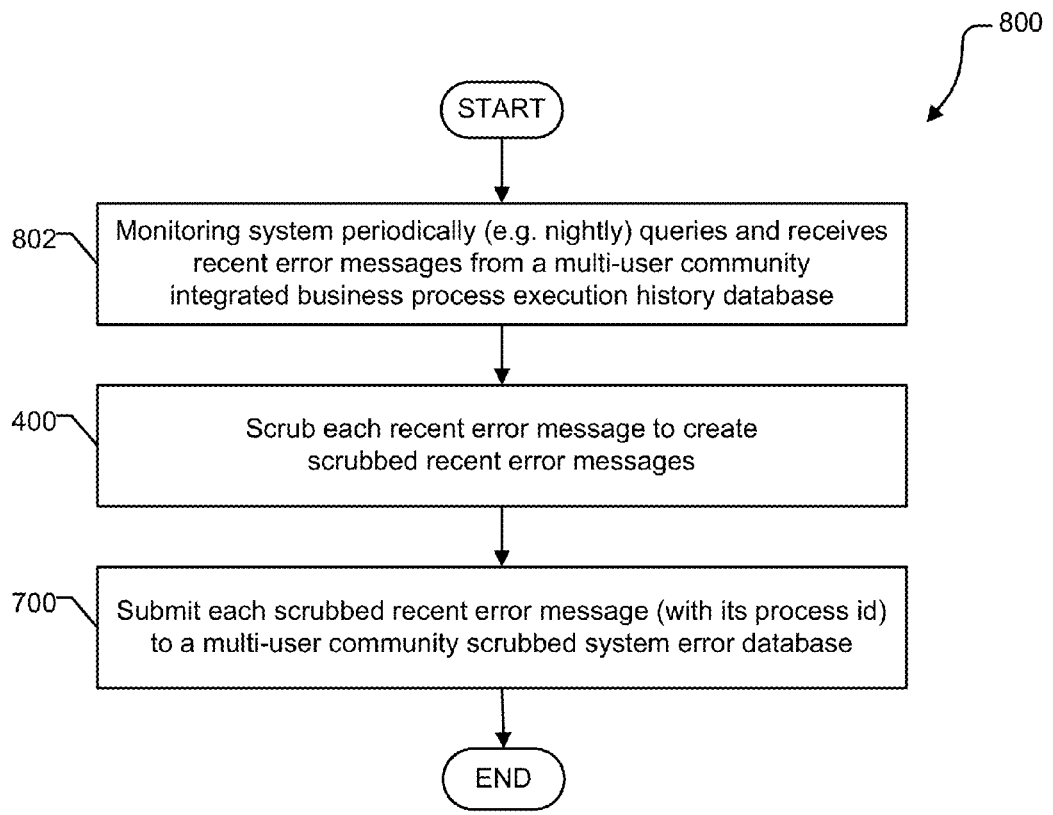
FIG. 8 is a flow diagram illustrating an error message monitoring method according to an embodiment of the present disclosure.

FIG. 8 shows an error message monitoring method 800 in accordance with an embodiment of the present disclosure. The error message monitoring method 800 shows how a monitoring system can access a multi-user community integrated business process execution history database containing a history of integrated business process execution records previously gathered from execution of users' integrated business process events to extract recent error messages and their associated information for scrubbing and submission to a multi-user community scrubbed system error database. Recent error messages are the error messages that have not been previously received by the monitoring system. Upon submission, tracking information is updated for scrubbed recent error messages. In this way, the monitoring system keeps the multi-user community scrubbed system error database up to date. In this example embodiment, the multi-user community integrated business process execution history database is located at a memory device with the service provider 80. Other storage locations are contemplated including a database maintained within the enterprise network 90 instead or in addition to a database at the service provider 80.

The flow begins at block 802 where the monitoring system periodically queries and receives recent error messages and their process ids for an integrated business process system error from a multi-user community integrated business process execution history database. In one embodiment, this occurs nightly. Other time periods are contemplated, however. The flow proceeds to block 400 where the method scrubs the recent error messages to create scrubbed recent error messages for removing user specific information and to allow similar errors to be grouped by common error text. The example error message scrubbing method 400 is found above with FIG. 4. The flow proceeds to block 700 where the method submits each scrubbed recent error message with its process id to a multi-user community scrubbed system error database. An example embodiment of this step was discussed above, for example, in FIG. 7.

It should be understood that the methods described in the embodiments shown in FIG. 3 through FIG. 8 may be conducted in a different order. In one embodiment, the information handling system operating the integrated business process system error resolution system is the service provider system/server 80 of FIG. 1. An information handling system with the enterprise network 90 is also contemplated to run the integrated business process system error resolution system. Alternatively, the integrated business process system error resolution system may be run from a hosted or other third environment (not shown in FIG. 1).

The information handling system running the integrated business process system error resolution system in the presently described embodiment is located in the service provider system 80. In one particular embodiment, the information handling system running the integrated business process initiates an HTTP or other network protocol based web request to transfer the monitored and gathered detailed status and error data to storage location in the service provider's network 80. Alternatively, an integrated business process system error resolution system could be maintained within the enterprise network 90 or hosted externally. The monitored and gathered detailed status and error data is reported back to the integrated business process system error resolution information handling system via well-known networked communication channels using standard communication protocols. Secured communications may be desirable, and therefore, encryption techniques may be employed to communicate the monitored and gathered detailed status and error data.

Figure 9:
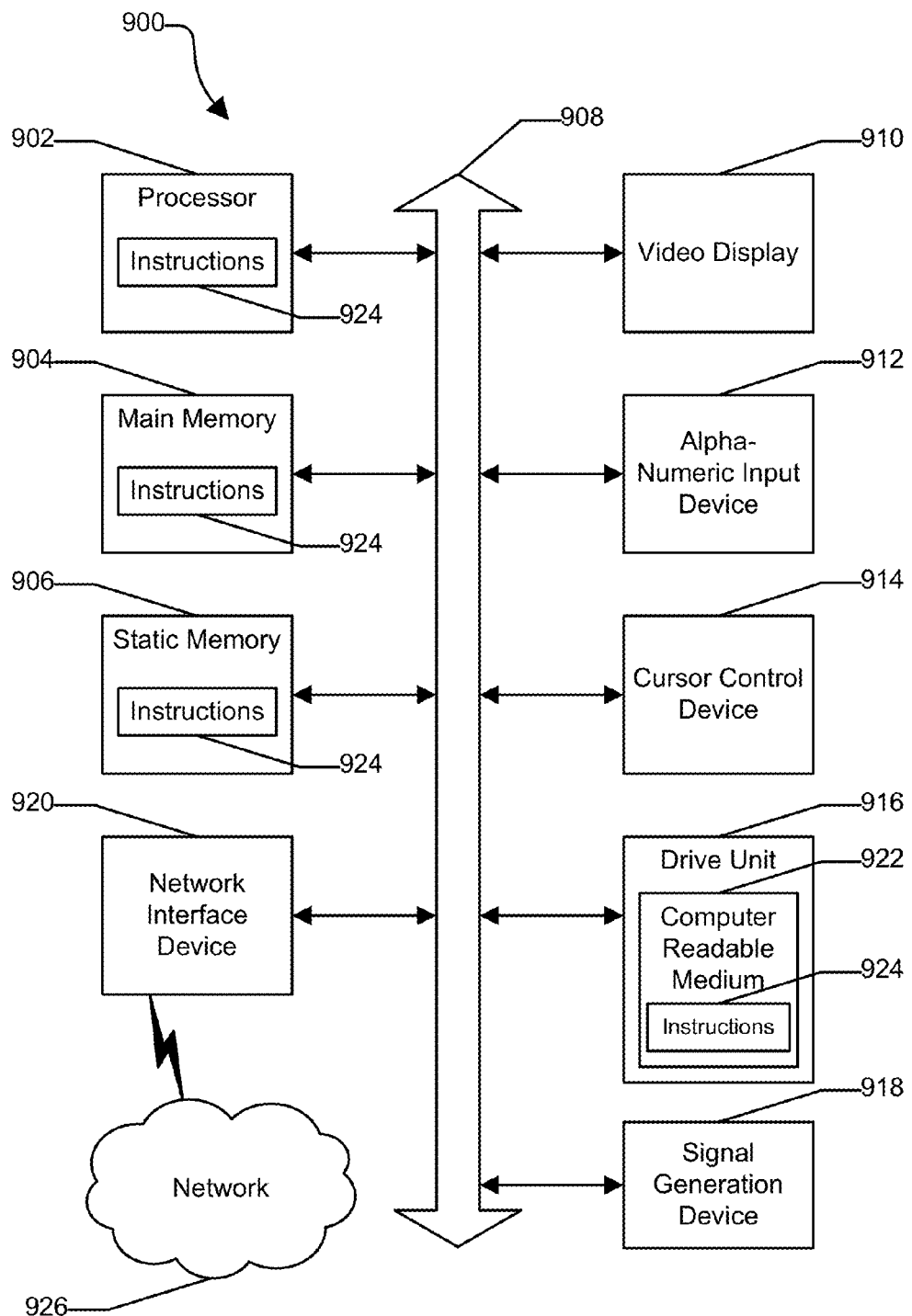
FIG. 9 illustrates a block diagram of an information handling system according to an embodiment of the present disclosure.

FIG. 9 shows an information handling system 900 capable of administering each of the specific embodiments of the present disclosure. The information handling system 900 can represent the user device 20, the systems 30, 60, 70, and 80 of FIG. 1, the system for resolving integrated business process system errors providing an error resolution graphical user interface display of 200 of FIG. 2, or another data processing device associated with the business network system 10. The information handling system 900 may include a processor 902 such as a central processing unit (CPU), a graphics processing unit (GPU), or both. Moreover, the information handling system 900 can include a main memory 904 and a static memory 906 that can communicate with each other via a bus 908. As shown, the information handling system 900 may further include a video display unit 910, such as a liquid crystal display (LCD), an organic light emitting diode (OLED), a flat panel display, a solid state display, or a cathode ray tube (CRT). The video display unit 910 may further be multi-touch screen enabled. Additionally, the information handling system 900 may include an input device 912, such as a keyboard, and a cursor control device 914, such as a mouse. The information handling system 900 can also include a disk drive unit 916, a signal generation device 918, such as a speaker or remote control, and a network interface device 920. The information handling system 900 can represent a server device whose resources can be shared by multiple user devices, or it can represent an individual user device, such as a desktop personal computer or a mobile device, such as a multi-touch screen tablet computer or a multi-touch screen smart phone, or it can represent various other types of information handling systems.

The information handling system 900 may include one or more bridges (not shown) such as a Northbridge and a Southbridge and may also include one or more buses (only one bus 908 is shown in FIG. 9) operable to transmit communications between the various hardware components. The processor 902 in the information handling system may be coupled to the Northbridge via a front-side bus. The Northbridge may also be coupled to the Southbridge via a data bus. The Northbridge may be further coupled to the Main memory 904 and the Static memory 906 via a memory bus. The Northbridge may also be coupled to the Video display device 910 via a high speed graphic bus, for example PCI Express. The Southbridge is coupled to the I/O devices including an Alpha-Numeric Input Device 912, a Cursor Control Device 914, a Signal Generation Device 918, a Drive unit 922, and a Network interface device 920.

The processor 902 in an information handling system may communicate, transmit data to and receive data from, any other device internal to the information handling system via the front side bus coupled to the Northbridge to a device coupled directly to the Northbridge, for example, main memory 904 or Static Memory 906 or communicate to another device via the front side bus coupled to the Northbridge, to the data bus coupled between the Northbridge and the Southbridge and a device coupled directly to the Southbridge, for example, drive unit storage device 916. The processor 902 in an information handling system may also communicate with any device external to the information handling system, for example, on the network 926, via the front side bus coupled to the Northbridge to the data bus coupled between the Northbridge and the Southbridge and the network interface device coupled to the Southbridge and coupled to the network 926.

To encapsulate and simplify some of the details described above, a processor interface device may include a processor 902, a front side bus, and a Northbridge which give the processor interface device the ability to communicate directly with any devices directly connected to the front side bus, for example the Northbridge and devices directly coupled to the Northbridge, for example the Main Memory 904 and Static memory 906. A processor interface device may also include a processor 902, a front side bus, a Northbridge, a data bus, a Southbridge and a network interface device 920 which gives the processor interface device the ability to communicate directly with the disk unit 916, the network interface device 920 and external devices located on the network 926. The processor interface device will be referred to throughout the present disclosure.

For further example, the information handling system 900 for resolving integrated business process system errors may administer the example methods of FIGS. 3 to 8 above. A user may be running the example methods on information handling system 900 connected to the network 926. The information handling system 900 may operate to provide a search platform for error resolution to an error message via an error resolution graphical user interface on the video display 910, receive the scrubbed resolution articles in rank-order via the network 926 and display via the error resolution graphical user interface on the video display 910, send user feedback via the network 926 for a vote via the error resolution graphical user interface on the video display 910 on the effectiveness of the scrubbed error resolution articles, and send a resolution article via the network 926 via the error resolution graphical user interface on the video display 910 for the error message.

The information handling system 900 may operate to receive a search request from a user via the network 926 for an error message, execute code to scrub the error message utilizing the multi-user community terms database at a storage device on drive unit 916, search the multi-user community scrubbed system error database at a storage device on drive unit 916 for scrubbed resolution articles using the scrubbed error message, send the scrubbed resolution articles in rank-order via the network 926, receive user feedback via the network 926 for a vote on the effectiveness of each scrubbed error resolution article, receive a resolution article from a user via the network 926, execute code to scrub the resolution article utilizing the multi-user community terms database at a storage device on drive unit 916, monitor the multi-user community integrated business process execution history database at a storage device on drive unit 916 for a first recent error message and submit the scrubbed first recent error message to a multi-user community scrubbed system error database at a storage device on drive unit 916.

The information handling system 900 can include a set of instructions that can be executed to cause the computer system to perform any one or more of the methods or computer based functions disclosed herein. The computer system 900 may operate as a standalone device or may be connected such as using a network, to other computer systems or peripheral devices.

In a networked deployment, the information handling system 900 may operate in the capacity of a server or as a client computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The disk drive unit 916 may include a computer-readable medium 922 in which one or more sets of instructions 924 such as software can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the information handling system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component or object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal; so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer-implemented method for resolving an error of an integrated business process system, the method comprising:
    scrubbing, via a processor executing instructions, an error message for the error to remove user specific information, wherein scrubbing the error message comprises:
        parsing, via the processor, the error message into individual terms;
        determining, via the processor, if each individual term represents a frequent term or an infrequent term based on a frequency count received, via a processor interface device from a multi-user community terms database, indicating a frequency that an individual term has occurred in previously received error messages; and
        creating, via the processor, a scrubbed error message by keeping frequent terms in the error message and replacing infrequent terms with a predetermined scrubbed value; and
    transmitting, via the processor interface device, a search request to a multi-user community scrubbed system error database for a first scrubbed resolution article using the scrubbed error message.

2. The method of claim 1, wherein determining if each individual term represents an infrequent term further comprises determining that the received frequency count for the individual term from the multi-user community terms database is less than a predetermined term threshold occurrence value.

3. The method of claim 1, further comprising:
    receiving the search request at a memory device from a user, via an error resolution graphical user interface via a video display device, the search request comprising the error message for the integrated business process system error.

4. The method of claim 1, further comprising:
    transmitting, via the processor interface device, an update to the multi-user community terms database for the individual term, wherein if the individual term exists in the multi-user community terms database, then incrementing the frequency count for the individual term in the multi-user community terms database.

5. The method of claim 1, wherein the search request transmitted to the multi-user community scrubbed system error database includes a search request based on context information comprising a shape type, a connector type, a transformation map, an exception type, or an integration class.

6. The method of claim 1, further comprising:
    the processor interface device receiving data for ranking the first scrubbed resolution article via a voting system;
    displaying, via an error resolution graphical user interface via a video display device, the first scrubbed resolution article in a rank-order;
    receiving a vote from a user, via the error resolution graphical user interface via the video display device, that up-votes or down-votes the first scrubbed resolution article on its effectiveness in resolving the integrated business process system error; and
    transmitting, via the processor interface device, an update to the multi-user community scrubbed system error database with an aggregated vote for the first scrubbed resolution article to leverage the user's expertise in determining effectiveness of the first scrubbed resolution article.

7. The method of claim 1, further comprising:
    receiving a new resolution article, via an error resolution graphical user interface via a video display device; and
    transmitting, via the processor interface device, an update to add the new resolution article to a resolution article moderator queue for approval by a community of experts.

8. The method of claim 7, wherein if the new resolution article is approved,
    scrubbing the new resolution article, via the processor executing instructions, to remove the user specific information to create a new scrubbed resolution article; and
    transmitting, via the processor interface device, an update to the multi-user community scrubbed system error database with the new scrubbed resolution article.

9. An information handling system for resolving integrated business process system errors, the system comprising:
    a processor executing instructions to scrub an error message for an integrated business process system error from an integrated business process event to remove user specific information, wherein the processor executing the instructions to scrub the error message comprises:
        the processor executing instructions to parse the error message into individual terms;
        the processor executing instructions to determine if each individual term represents a frequent term or an infrequent term based on a frequency count received via a processor interface device from a multi-user community terms database at a storage device indicating a frequency that an individual term has occurred in previously received error messages; and the processor executing instructions to create a scrubbed error message by keeping frequent terms in the error message and replacing infrequent terms with a predetermined scrubbed value; and the processor interface device for transmitting a search request to a multi-user community scrubbed system error database at a storage device for a first scrubbed resolution article using the scrubbed error message.

10. The information handling system of claim 9, wherein the processor further determines if each individual term represents a frequent term by determining whether the frequency count for the individual term from the multi-user community terms database is equal to or greater than a predetermined term threshold occurrence value.

11. The information handling system of claim 9, further comprising:

the processor interface device transmitting an update to the multi-user community terms database at the storage device for the individual term, wherein if the individual term does not exist in the multi-user community terms database at the storage device, then the update adds the individual term, a unique term identifier value, and sets the frequency count initially to one, for the individual term to the multi-user community terms database at the storage device.

12. The information handling system of claim 9, further comprising:

the processor interface device receiving data for ranking the first scrubbed resolution article via a voting system;

the processor interface device sending the first scrubbed resolution article in a rank-order to display, via an error resolution graphical user interface via a video display device connected to the information handling system;

the processor interface device receiving a vote from a user, via the error resolution graphical user interface via the video display device connected to the information handling system, that up-votes or down-votes the first scrubbed resolution article on its effectiveness in resolving the integrated business process system error; and the processor interface device transmitting an update to the multi-user community scrubbed system error database at the storage device with an aggregated vote for the first scrubbed resolution article to leverage the user's expertise in determining effectiveness of the first scrubbed resolution article.

13. The information handling system of claim 9, further comprising:

the processor interface device receiving a new resolution article, via an error resolution graphical user interface via a video display device connected to the information handling system; and the processor interface device transmitting an update to add the new resolution article to a resolution article moderator queue for approval by a community of experts.

14. The information handling system of claim 13, wherein if the new resolution article is approved by the community of experts, the processor scrubbing the new resolution article to remove user specific information to create a new scrubbed resolution article; and the processor interface device transmitting an update to the multi-user community scrubbed system error database at the storage device with the new scrubbed resolution article.

15. The information handling system of claim 9, further comprising:

the processor interface device submitting the scrubbed error message with a process id to the multi-user community scrubbed system error database at the storage device.

16. The information handling system of claim 15, wherein if no scrubbed resolution article to the integrated business process system error is found, the processor determining if a trend count for the scrubbed error message received, via the processor interface device, from the multi-user community scrubbed system error database at the storage device is equal to or greater than a predetermined threshold trend count, the processor interface device transmitting an update to add the scrubbed error message to a resolution article moderator queue for creating a scrubbed experts' resolution article by a community of experts;

the processor interface device transmitting an update to the multi-user community scrubbed system error database at the storage device with the scrubbed experts' resolution article; and the processor interface device transmitting a notification to users that encountered the integrated business process system error that the scrubbed experts' resolution article is available.

17. A non-transitory computer readable medium comprising instructions to resolve integrated business process system errors, the instructions comprising instructions to:

scrub an error message for an integrated business process system error from an integrated business process event to remove user specific information, wherein the instructions to scrub the error message further comprise instructions to:

parse the error message into individual terms;

determine if each individual term represents a frequent term or an infrequent term based on a frequency count received via a processor interface device from a database for a multi-user community terms indicating a frequency that an individual term has occurred in previously received error messages; and create a scrubbed error message by keeping frequent terms in the error message and replacing infrequent terms with a predetermined scrubbed value; and transmit, via the processor interface device, a search request to a database for a multi-user community scrubbed system error for a first scrubbed resolution article using the scrubbed error message.

18. The computer readable medium of claim 17, wherein the instructions to determine if each individual term represents an infrequent term further comprise instructions to determine that the frequency count for the individual term is less than a predetermined term threshold occurrence value.

19. The computer readable medium of claim 17, wherein the instructions further comprise instructions to:

transmit, via the processor interface device, an update to the database for the multi-user community terms for the individual term, wherein if the individual term exists in the database for the multi-user community terms, then the update increments the frequency count for the individual term in the database for the multi-user community terms.

20. The computer readable medium of claim 17, wherein if no scrubbed resolution article to the integrated business process system error is found corresponding to the scrubbed error message, the instructions further comprise instructions to:

determine if a total count received via the processor interface device from the database for the multi-user community scrubbed system error for the scrubbed error message is equal to or greater than a predetermined threshold count,
transmit, via the processor interface device, an update to add the scrubbed error message to a resolution article moderator queue to create a scrubbed experts' resolution article by a community of experts; and
transmit, via the processor interface device, an update to add the scrubbed experts' resolution article to the database for the multi-user community scrubbed system error.

* * * * *